United States Patent
Nakano et al.

(10) Patent No.: US 9,819,778 B2
(45) Date of Patent: Nov. 14, 2017

(54) INTERFACE, COMMUNICATION APPARATUS, AND PROGRAM

(71) Applicant: Murata Manufacturing Co., Ltd., Nagaokakyo-shi, Kyoto-fu (JP)

(72) Inventors: Shinichi Nakano, Nagaokakyo (JP); Teppei Miura, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/675,917

(22) Filed: Apr. 1, 2015

(65) Prior Publication Data

US 2015/0207913 A1 Jul. 23, 2015

Related U.S. Application Data

(63) Continuation of application No. PCT/JP2013/075453, filed on Sep. 20, 2013.

(30) Foreign Application Priority Data

Oct. 26, 2012 (JP) .................................. 2012-237326
Jul. 2, 2013 (JP) ................................. 2013-139068

(51) Int. Cl.
*H04B 5/00* (2006.01)
*H04M 1/725* (2006.01)
(Continued)

(52) U.S. Cl.
CPC .......... *H04M 1/7253* (2013.01); *H01Q 1/243* (2013.01); *H01Q 7/00* (2013.01);
(Continued)

(58) Field of Classification Search
None
See application file for complete search history.

(56) References Cited

U.S. PATENT DOCUMENTS 9,620,843 B2 * 4/2017 Wolff ...................... H01P 11/00
2005/0007296 A1 * 1/2005 Endo .................. G06K 19/0726
343/895

(Continued)

FOREIGN PATENT DOCUMENTS

EP 2 056 400 A1 5/2009
EP 2 424 041 A1 2/2012
(Continued)

OTHER PUBLICATIONS

English translation of Official Communication issued in corresponding International Application PCT/JP2013/075453, dated Dec. 3, 2013.

(Continued)

*Primary Examiner* — Zhiyu Lu
(74) *Attorney, Agent, or Firm* — Keating & Bennett, LLP

(57) ABSTRACT

A power supply coil is disposed on a rear surface of a display via a shield plate. When a current flows in the power supply coil, a magnetic flux emitted from the power supply coil traverses an opening of the shield plate. As a result, the power supply coil and the shield plate are electromagnetically coupled and the shield plate defines and functions as an antenna. Accordingly, a communication terminal communicates favorably with a smartcard, which is a device positioned on a front surface side of the display.

19 Claims, 26 Drawing Sheets

(51) Int. Cl.
*H01Q 7/00* (2006.01)
*H01Q 1/24* (2006.01)
*H04B 5/02* (2006.01)
*H04W 4/00* (2009.01)
*H04W 88/06* (2009.01)

(52) U.S. Cl.
CPC ......... *H04B 5/0037* (2013.01); *H04B 5/0075* (2013.01); *H04B 5/02* (2013.01); *H04W 4/008* (2013.01); *H04W 88/06* (2013.01)

(56) References Cited

U.S. PATENT DOCUMENTS

| | | | |
|---|---|---|---|
| 2005/0178835 A1* | 8/2005 | Akiho | G06K 7/0008 235/451 |
| 2008/0158111 A1* | 7/2008 | Sakata | H04N 5/44 345/76 |
| 2008/0207282 A1* | 8/2008 | Schaffler | H01Q 1/243 455/575.3 |
| 2008/0278384 A1* | 11/2008 | Shimasaki | H01Q 1/2266 343/702 |
| 2008/0316115 A1* | 12/2008 | Hill | H01Q 1/243 343/702 |
| 2009/0021446 A1 | 1/2009 | Kataya et al. | |
| 2009/0083149 A1* | 3/2009 | Maekawa | G06Q 30/02 705/14.1 |
| 2009/0096413 A1* | 4/2009 | Partovi | H01F 5/003 320/108 |
| 2009/0266900 A1 | 10/2009 | Ikemoto et al. | |
| 2010/0103058 A1* | 4/2010 | Kato | G06K 19/07749 343/702 |
| 2010/0309081 A1* | 12/2010 | Kobayashi | G06K 7/10316 343/788 |
| 2010/0315389 A1* | 12/2010 | Sorrell | H01Q 1/22 345/204 |
| 2011/0031320 A1* | 2/2011 | Kato | G06K 19/07749 235/492 |
| 2011/0227799 A1 | 9/2011 | Hashimoto | |
| 2011/0291896 A1* | 12/2011 | Pascolini | H01Q 1/243 343/702 |
| 2012/0062435 A1* | 3/2012 | Kato | H01Q 7/06 343/787 |
| 2012/0091821 A1* | 4/2012 | Kato | H01Q 1/38 307/104 |
| 2012/0112552 A1* | 5/2012 | Baarman | H05K 9/002 307/104 |
| 2012/0322374 A1 | 12/2012 | Yamaoka et al. | |
| 2013/0099994 A1 | 4/2013 | Yosui | |
| 2013/0154891 A1 | 6/2013 | Kubo et al. | |
| 2013/0181876 A1 | 7/2013 | Miura et al. | |
| 2014/0004808 A1* | 1/2014 | Li | H01Q 1/22 455/90.2 |
| 2014/0091758 A1* | 4/2014 | Hidaka | H01F 38/14 320/108 |
| 2014/0213178 A1* | 7/2014 | Wolff | H01P 11/00 455/41.1 |
| 2014/0340273 A1 | 11/2014 | Kato et al. | |

FOREIGN PATENT DOCUMENTS

| | | |
|---|---|---|
| GB | 2 350 461 A | 11/2000 |
| JP | 11-25244 A | 1/1999 |
| JP | 2006-195802 A | 7/2006 |
| JP | 2009-211372 A | 9/2009 |
| JP | 2011-103702 A | 5/2011 |
| JP | 2011-244624 A | 12/2011 |
| JP | 2012-60372 A | 3/2012 |
| WO | 2009011154 A1 | 1/2009 |
| WO | 2012/014939 A1 | 2/2012 |
| WO | 2012/020581 A1 | 2/2012 |
| WO | 2012/033031 A1 | 3/2012 |
| WO | 2012/090494 A1 | 7/2012 |

OTHER PUBLICATIONS

Official Communication issued in corresponding UK Patent Application No. GB1507097.2, dated Mar. 24, 2016.
Official Communication issued in corresponding Great Britian Patent Application No. 1612869.6, dated Aug. 31, 2016.
Official Communication issued in corresponding Great Britian Patent Application No. 1507097.2, dated Aug. 31, 2016.

* cited by examiner

INTERFACE, COMMUNICATION APPARATUS, AND PROGRAM

BACKGROUND OF THE INVENTION

1. Field of the Invention

The present invention relates to interfaces, communication apparatuses, and programs.

2. Description of the Related Art

With the advancement of processors, communication terminals, as exemplified by cellular phones, are approaching the same level of functionality as personal computers. In particular, communication terminals that have GUIs (Graphical User Interfaces) are capable of providing interfaces to users to suit various purposes. For this reason, in addition to telephones, there are high expectations for the use of such interfaces in near-field communication compliant with the NFC (Near Field Communication) standard.

To carry out near-field communication, it has thus far been necessary to bring an antenna disposed on a rear surface side of a communication terminal close to an external device serving as the subject for communication. A mark is therefore provided on the rear surface of the communication terminal to indicate the antenna position.

However, if, for example, the communication terminal is equipped with a cover or the like made of silicon rubber, the mark indicating the antenna position can no longer be seen from the exterior. Meanwhile, in the case where the housing of the communication terminal is made of a metal such as aluminum or stainless steel, problems such as a decrease in the communication range and an inability to communicate altogether can arise. Furthermore, when using a comparatively large communication terminal such as a tablet terminal or the like to read out information recorded in a smartcard, it is more convenient to be able to carry out the near-field communication from the front surface side of the communication terminal.

A technique for implementing near-field communication from the front surface side of a communication terminal has been proposed (see Japanese Unexamined Patent Application Publication No. 2006-195802, for example). A reader/writer apparatus disclosed in Japanese Unexamined Patent Application Publication No. 2006-195802 includes an antenna that is overlapped with a liquid crystal panel display screen. This enables favorable communication with devices, smartcards, and so on positioned on the front surface side of the liquid crystal panel.

An antenna pattern in the reader/writer apparatus disclosed in Japanese Unexamined Patent Application Publication No. 2006-195802 is formed by sputtering a transparent conductive material on a transparent substrate that overlaps with the liquid crystal panel and then patterning the sputtered material. There is thus a problem in that the structure of the display device that includes the antenna pattern is complicated. Specifically, the position of the antenna pattern relative to the liquid crystal panel will differ depending on the model of the reader/writer apparatus, its applications, and so on. It is therefore necessary to form different antenna patterns for each model.

ITO (Indium Tin Oxide) is often used as the stated transparent conductive material. However, ITO has less than or equal to 1/100 the conductivity of such highly-conductive metals as copper, aluminum, or silver. Antennas having coils configured of ITO thus have difficulty achieving Q characteristics that provide satisfactory antenna performance.

Furthermore, in the case where a shield plate is disposed on the rear surface of the liquid crystal panel to block noise emanating from the liquid crystal panel, induced current produced by the shield plate can lead to a worsening of the antenna characteristics.

SUMMARY OF THE INVENTION

Preferred embodiments of the present invention enable favorable communication with a device positioned near a display device without complicating the structure of the display device.

An interface according to a first aspect of various preferred embodiments of the present invention includes a display device that displays information on a surface on one side, a shield plate disposed on another side of the display device, and a power supply coil that electromagnetically couples with the shield plate.

The shield plate preferably is disposed between the display device and the power supply coil, and the power supply coil preferably is disposed so that a coil opening portion of the power supply coil is at least partially exposed from the shield plate toward the display device.

The power supply coil preferably is disposed between the display device and the shield plate, and the power supply coil preferably is disposed so that a coil opening portion of the power supply coil is at least partially exposed from the shield plate in the opposite direction from the display device.

An opening portion that exposes the coil opening portion preferably is preferably provided in the shield plate.

The opening portion preferably includes an opening provided in the shield plate and a slit extending from the opening to an outer edge of the shield plate.

The opening portion preferably includes a slit in the shield plate.

The display device preferably displays a position of the power supply coil.

The display device preferably displays a position where a sensitivity of the power supply coil is highest.

A touch panel overlapping with the surface on the one side of the display device preferably is included.

The touch panel preferably is an electrostatic capacitance-type touch panel.

The display device preferably is a liquid crystal panel.

The liquid crystal panel preferably includes a plurality of transparent electrodes arranged at equal or substantially equal or substantially equal intervals in a first direction and a plurality of transparent electrodes that face the transparent electrodes and are arranged at equal or substantially equal or substantially equal intervals in a second direction perpendicular or substantially perpendicular to the first direction.

A communication apparatus according to a second aspect of various preferred embodiments of the present invention includes the interface according to the first aspect of various preferred embodiments of the present invention and a communication unit that communicates with an external device via the power supply coil of the interface.

The communication unit may carry out near-field communication with the external device.

A non-transitory computer readable mediums contains a program according to a third aspect of the present invention which causes a computer to execute a procedure for displaying a position of the power supply coil in the display device of the interface according to the first aspect of various preferred embodiments of the present invention.

A non-transitory computer readable medium contains a program according to a fourth aspect of the present invention which causes a computer to execute a procedure for displaying a position at which the sensitivity of the power supply coil is highest in the display device of the interface according to the first aspect of various preferred embodiments of the present invention.

According to various preferred embodiments of the present invention, the power supply coil is disposed, via the shield plate, on the side of the display device whose other side serves as a display surface. The shape of the power supply coil is thus not restricted by its relationship with the display device. This avoids complicating the structure of the power supply coil. This in turn avoids complicating the structure of the display device. Furthermore, according to various preferred embodiments of the present invention, the power supply coil and the shield plate electromagnetically couple under the magnetic field produced by the power supply coil, and thus the shield plate provides functionality equivalent to that of an antenna. This enables favorable communication with a device positioned in the vicinity of the display device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a first preferred embodiment of the present invention will be described in detail with reference to the drawings. An XYZ coordinate system composed of mutually-orthogonal X, Y, and Z axes is used in the descriptions as appropriate.

Figure 1:
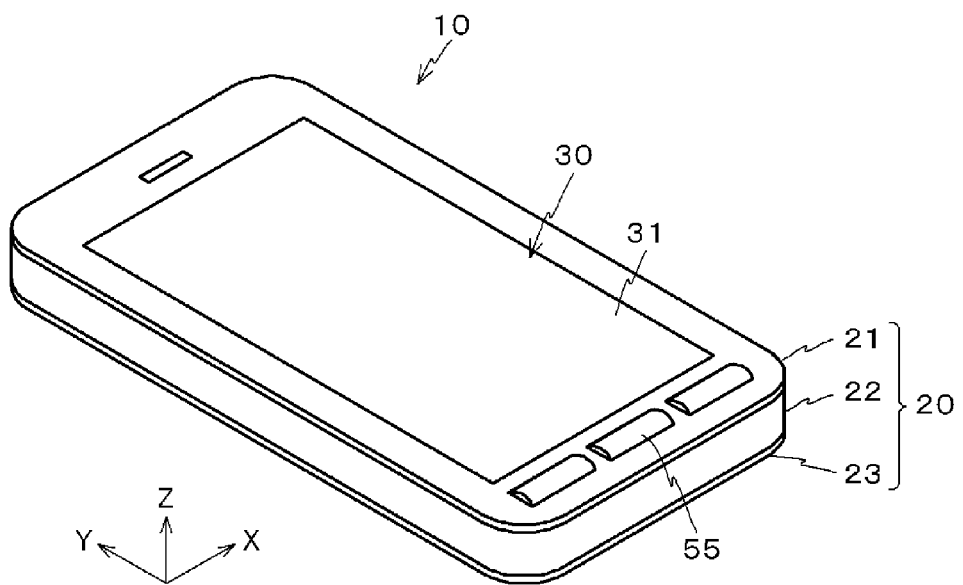
FIG. 1 is a perspective view of a communication terminal according to a first preferred embodiment of the present invention.

As illustrated in FIG. 1, a communication terminal 10 according to the present preferred embodiment preferably is a smartphone including an interface 30 contained within a housing 20. The interface 30 preferably is a touch panel-based graphical user interface.

Figure 2:
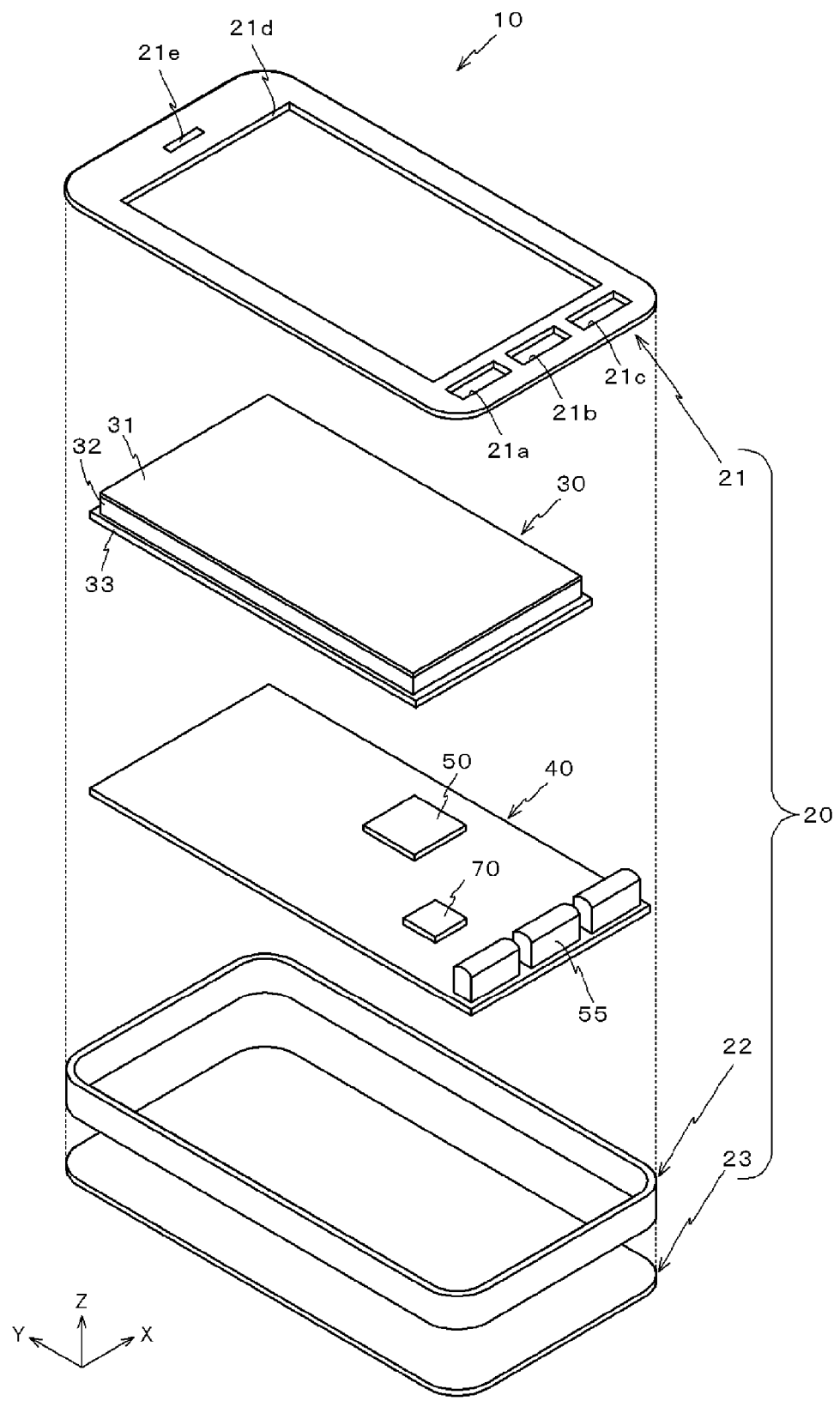
FIG. 2 is an exploded perspective view of a communication terminal.

As illustrated in FIG. 2, the communication terminal 10 includes a front panel 21, a frame 22, and a rear panel 23 that configure the housing 20, as well as the interface 30 contained within the housing 20 and a control board 40.

The front panel 21 preferably is a rectangular or substantially rectangular panel whose longer direction matches the Y axis direction. A rectangular or substantially rectangular opening 21d that exposes the interface 30 is provided in the front panel 21. Rectangular or substantially rectangular openings 21a, 21b, and 21c whose longer directions match the X axis direction are provided at equal or substantially equal intervals along the X axis, on the −Y side of the opening 21d formed in the front panel 21. An opening 21e whose longer direction matches the X axis direction is provided on the +Y side of the opening 21d provided in the front panel 21. Glass or a resin, for example, can be used as the material of the front panel 21.

The rear panel 23 is a rectangular or substantially rectangular panel configured of aluminum, for example, whose longer direction matches the Y axis direction. The rear panel 23 preferably has the same size as the front panel 21.

The frame 22 is a frame-shaped member preferably configured of a metal such as aluminum or stainless steel, for example. The housing 20 is preferably configured by affixing the front panel 21 to the top of the frame 22 and affixing the rear panel 23 to the bottom of the frame 22.

Figure 3:
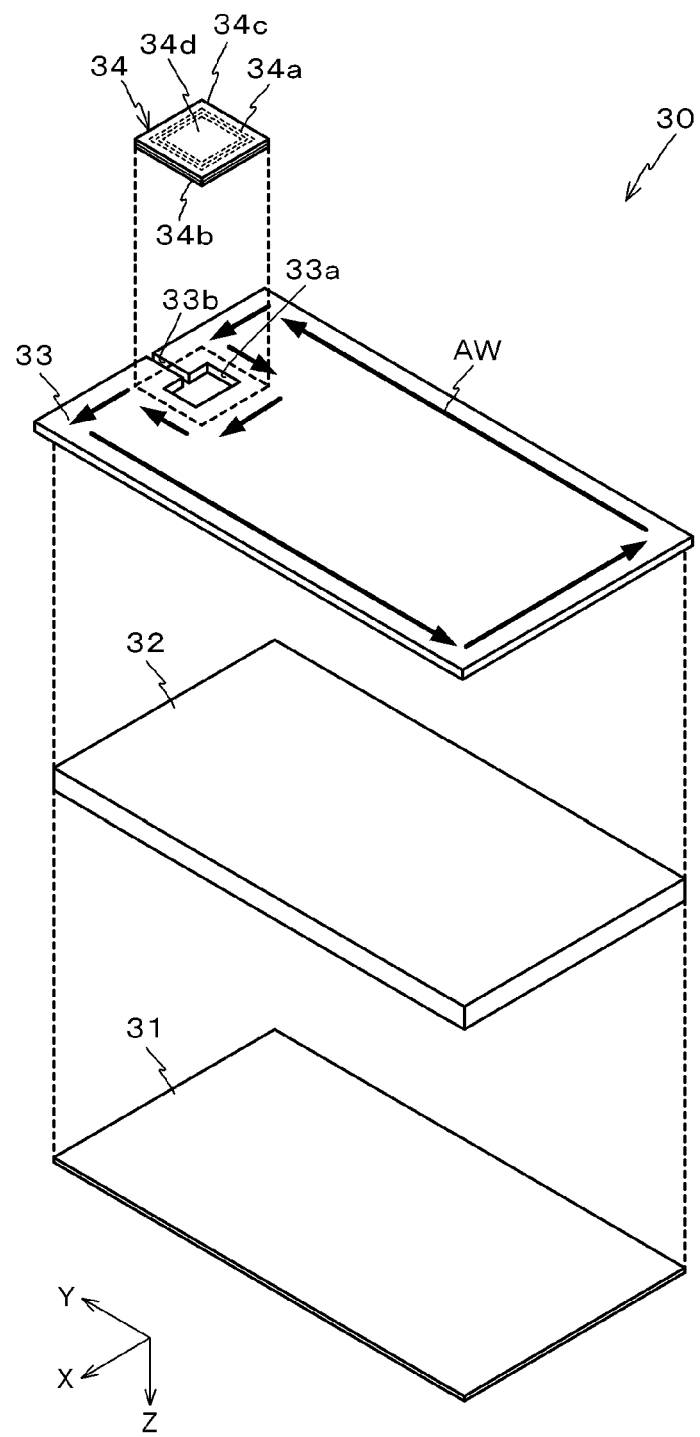
FIG. 3 is an exploded perspective view of an interface.

As illustrated in FIG. 3, the interface 30 includes a touch panel 31, a display 32, a shield plate 33, and a power supply coil 34.

The display 32 is a rectangular or substantially rectangular flat-panel display whose longer direction matches the Y axis direction. Specifically, the display 32 is a liquid crystal panel including transparent electrodes disposed in a matrix. The display 32 includes a display screen of the same or substantially the same size as the opening 21d provided in the front panel 21. A +Z side surface of the display 32 defines and serves as the display screen.

The touch panel 31 is an electrostatic capacitance-type touch panel, for example. Like the display 32, the touch panel 31 includes transparent electrodes disposed in a matrix. The touch panel 31 preferably has the same or substantially the same size as the display screen of the display 32. The touch panel 31 is disposed on top of the display screen of the display 32.

The shield plate 33 is a metal plate preferably having the same or substantially the same planar dimensions as the display 32 and sufficiently larger planar dimensions than the power supply coil 34, and whose longer direction matches the Y axis direction. The shield plate 33 is, for example, a chassis member configured of a metal such as aluminum, a galvanized steel plate, a stainless steel plate, or the like. The shield plate 33 prevents electromagnetic waves emanating from the display 32 disposed on the front surface (the +Z side surface) of the shield plate 33 from entering electric circuitry on the control board 40 as noise. The shield plate 33 also defines and functions as a reinforcing plate that protects the display 32 from impacts such as the communication terminal 10 being dropped.

A rectangular or substantially rectangular opening 33a is provided in a +Y side end portion of the shield plate 33. Furthermore, a slit 33b extending from the opening 33a to a +Y side edge of the shield plate 33 is provided in the shield plate 33. The opening 33a is configured to allow a magnetic flux produced by the power supply coil 34 to traverse. The slit 33b, meanwhile, is configured to significantly reduce or prevent induced current arising around the opening 33a due to the magnetic flux passing through the opening 33a.

Figure 4:
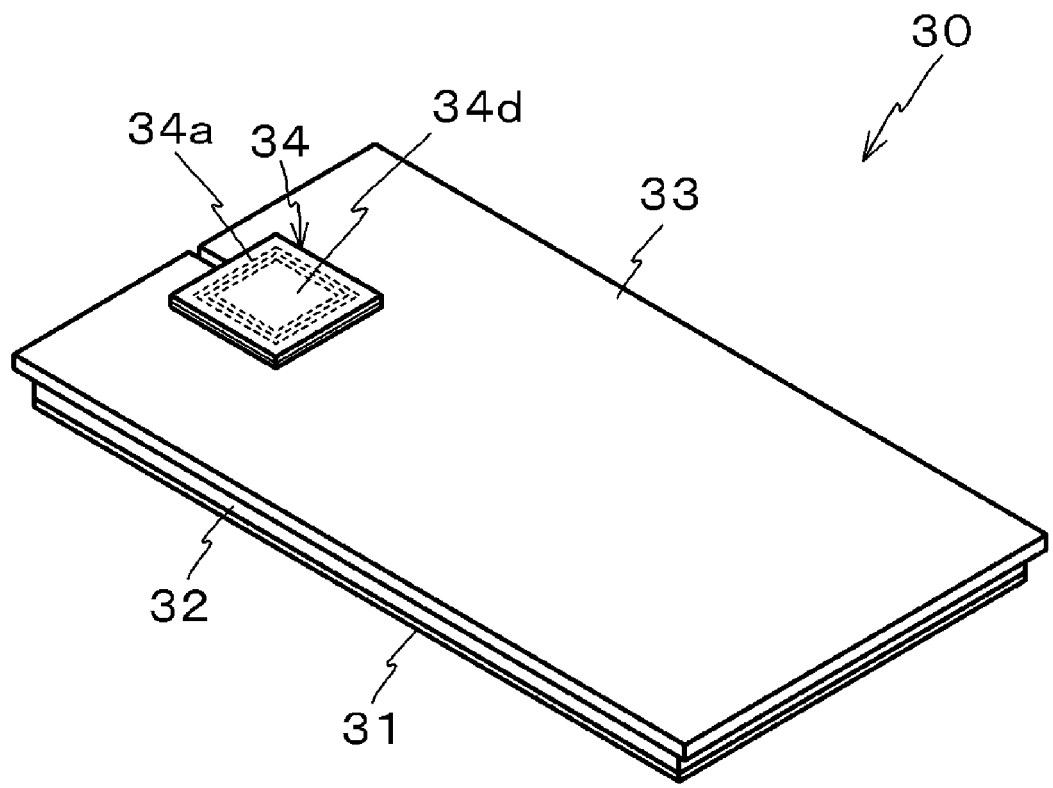
FIG. 4 is a perspective view of an interface.
Figure 4:
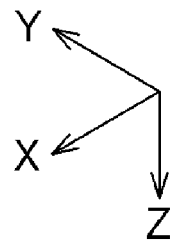
Figure 5:
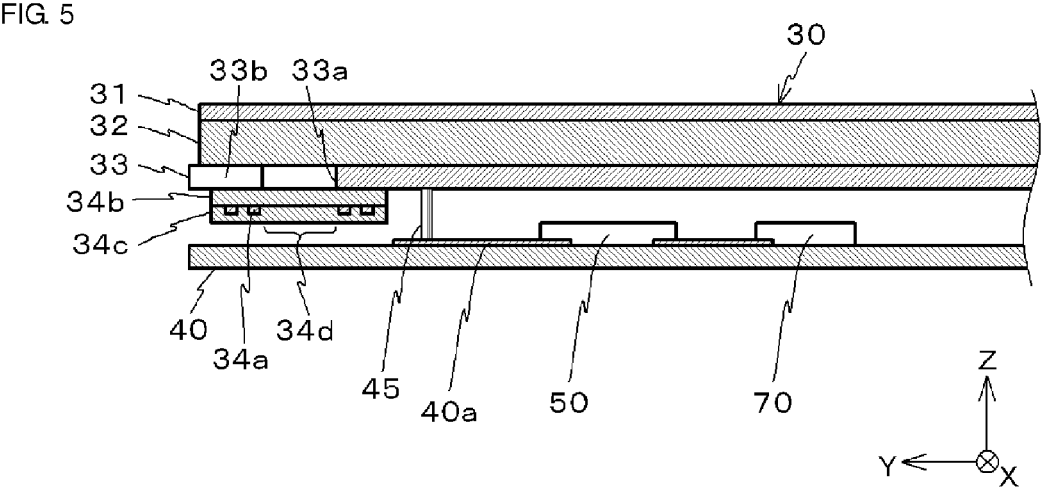
FIG. 5 is a cross-sectional view of an interface.

The power supply coil 34 includes a coil pattern 34a whose center axis is an axis parallel or substantially parallel to the Z axis, a film 34b that covers a +Z side surface of the coil pattern 34a, and a magnetic sheet 34c affixed to a −Z side surface of the power supply coil 34. As illustrated in FIGS. 3-5, the power supply coil 34 is affixed to the rear surface (the −Z side surface) of the shield plate 33 so that an opening portion of the coil pattern 34a (called a "coil opening portion 34d" hereinafter) at least partially overlaps with the opening 33a in the shield plate 33. In other words, as illustrated in FIG. 5, the power supply coil 34 is disposed so that the coil opening portion 34d is at least partially exposed to the display 32 (in the +Z direction) from the shield plate 33. A magnetic flux produced when a current flows in the power supply coil 34 therefore traverses the opening 33a provided in the shield plate 33 and passes through the display 32 and the touch panel 31.

The display 32, the shield plate 33, and the power supply coil 34 are preferably integrated into a single entity by affixing the power supply coil 34 to the rear surface of the shield plate 33 and then affixing the display 32, to which the touch panel 31 is attached, to the front surface of the shield plate 33. The interface 30 including the touch panel 31, the display 32, the shield plate 33, and the power supply coil 34 is completed as a result. The interface 30 is disposed on a top surface of the control board 40 using spring pins 45, as illustrated in FIG. 5.

According to the interface 30 configured as described thus far, when a current flows in the coil pattern 34a of the power supply coil 34, a magnetic flux produced by the current traverses the opening 33a in the shield plate 33. An induced current arises around the opening 33a when the magnetic flux traverses the opening 33a. The slit 33b that extends from the opening 33a to the edge of the shield plate 33 is provided in the shield plate 33, as illustrated in FIG. 3. Accordingly, the induced current that arises around the opening 33a flows along the edges of the opening 33a and the edges of the shield plate 33 due to a cut-edge effect, as indicated by an arrow AW in FIG. 3.

A relationship between the current flowing in the coil pattern 34a of the power supply coil 34 and the induced current arising in the shield plate 33 will be described using FIG. 6.

Figure 6:
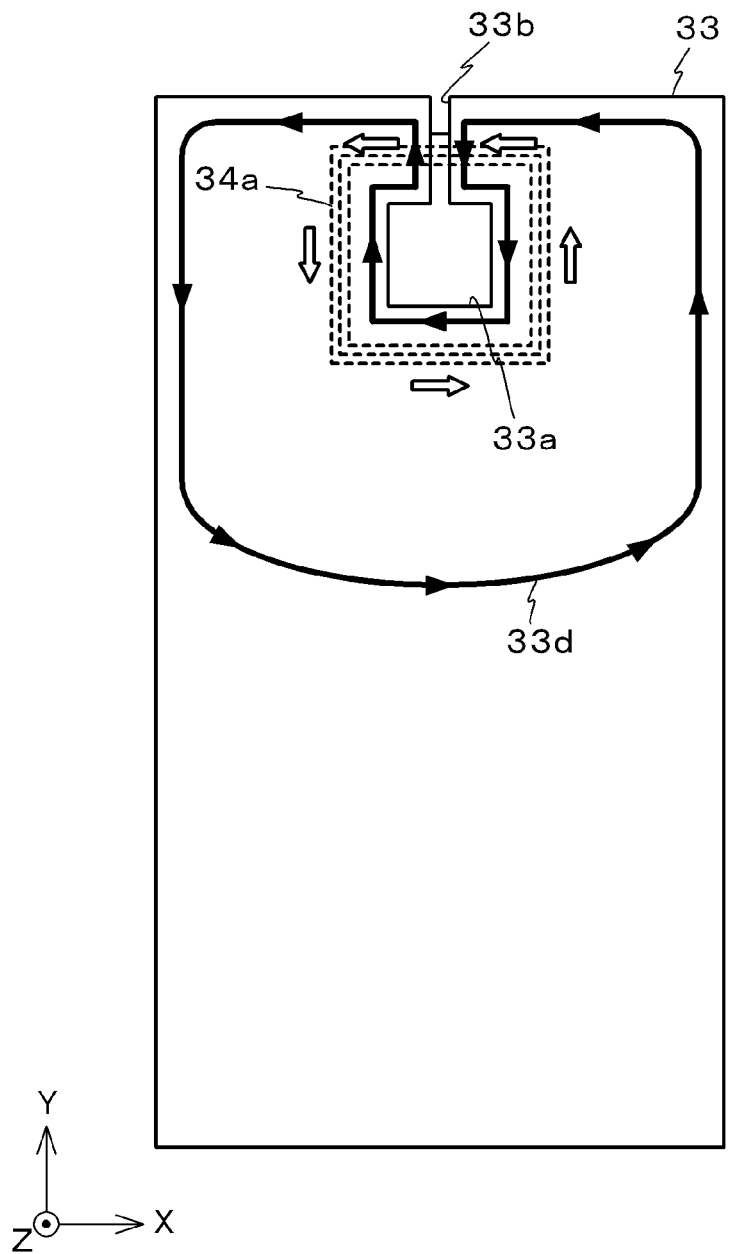
FIG. 6 is a diagram illustrating a relationship between a current flowing through a coil and induced current produced in a shield plate.

As illustrated in FIG. 6, when a current flows in the coil pattern 34a in the direction indicated by the white arrows, an induced current flowing in a direction that cancels out the magnetic flux produced by the current flowing in the coil pattern 34a, or in other words, the opposite direction from the current flowing in the coil pattern 34a, arises at the edges of the opening 33a. This induced current moves toward the edge of the shield plate 33 due to the cut-edge effect. As a result, an induced current flows along a closed path 33d in the shield plate 33, indicated in FIG. 6. A distribution of the induced current flowing in the shield plate 33 depends on the magnitude, frequency, and so on of a voltage applied to the coil pattern 34a.

Specifically, when the voltage is high or the frequency is low, the induced current flows broadly, as indicated in FIG. 3. However, when the voltage is low or the frequency is high, the induced current flows narrowly, as indicated in FIG. 6.

The induced current flowing in the edge of the shield plate 33 flows in the same direction as the current flowing in the coil pattern 34a. As such, although the induced current flowing in the edge of the opening 33a does have some influence, the shield plate 33 has the same function as an antenna having the same size as the shield plate 33 due to the mutual effects of the induced current flowing in the edge of the shield plate and the current flowing in the coil pattern 34a. Thus, according to the interface 30, even if the shield plate 33 that is originally provided to block noise from the display 32 is facing an external device serving as the subject of communication, information is still able to be sent to that external device.

Meanwhile, when the shield plate 33 is subjected to a magnetic field produced by the external device, an induced current flows in the edge of the shield plate 33 in the same manner, and a magnetic flux from the external device passes through the opening 33a and traverses the coil opening portion 34d in the coil pattern 34a that configures the power supply coil 34, in the same manner as described above. In this case, the magnetic flux traversing the coil opening portion 34d in the coil pattern 34a is strengthened by the induced current flowing along the edges of the shield plate 33. Thus, according to the interface 30, even if the shield plate 33 that is originally provided to block noise from the display 32 is facing the external device serving as the subject of communication, information is still able to be received from that external device. In other words, the shield plate 33 defines and functions as an antenna element (a booster antenna) for near-field communication.

The above technique is also disclosed in detail in Japanese Unexamined Patent Application Publication No. 2011-103702 by the inventors of the present application. The details thereof are incorporated herein by reference.

As illustrated in FIG. 2, the control board 40 is a printed circuit board whose longer direction matches the Y axis direction. Electrical components such as an RFIC 70, a CPU 50, pushbuttons 55, and so on are mounted on the control board 40. These electrical components are electrically connected to each other by a wiring pattern 40a (see FIG. 5) provided on the control board 40.

Figure 7:
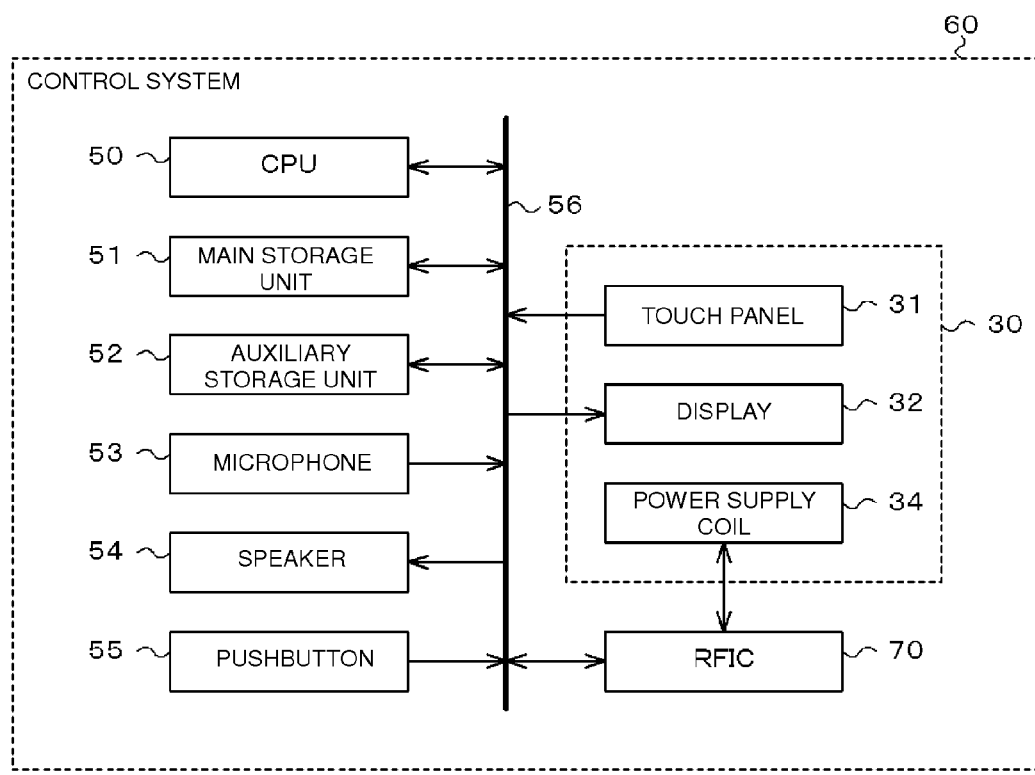
FIG. 7 is a block diagram illustrating a control system.

In the present preferred embodiment, the electrical components mounted on the control board 40 and the interface 30 configure a control system 60, illustrated in FIG. 7. The control system 60 includes the RFIC 70, the CPU 50, a main storage unit 51, an auxiliary storage unit 52, a microphone 53, a speaker 54, and the pushbuttons 55, as well as a bus 56 configured to connect those elements to the interface 30.

The RFIC 70 is a signal processing circuit for near-field communication (NFC), and is configured as a chip component. In other words, the RFIC 70 configures a communication unit that communicates with an external device.

The main storage unit 51 is configured including a RAM (Random Access Memory) and the like, and is used as a work area for the CPU 50.

The auxiliary storage unit 52 includes a non-volatile memory such as a ROM (Read Only Memory), a semiconductor memory, or the like. The auxiliary storage unit 52 stores programs executed by the CPU 50, various types of parameters, position information of the power supply coil 34, and so on.

Figure 8:
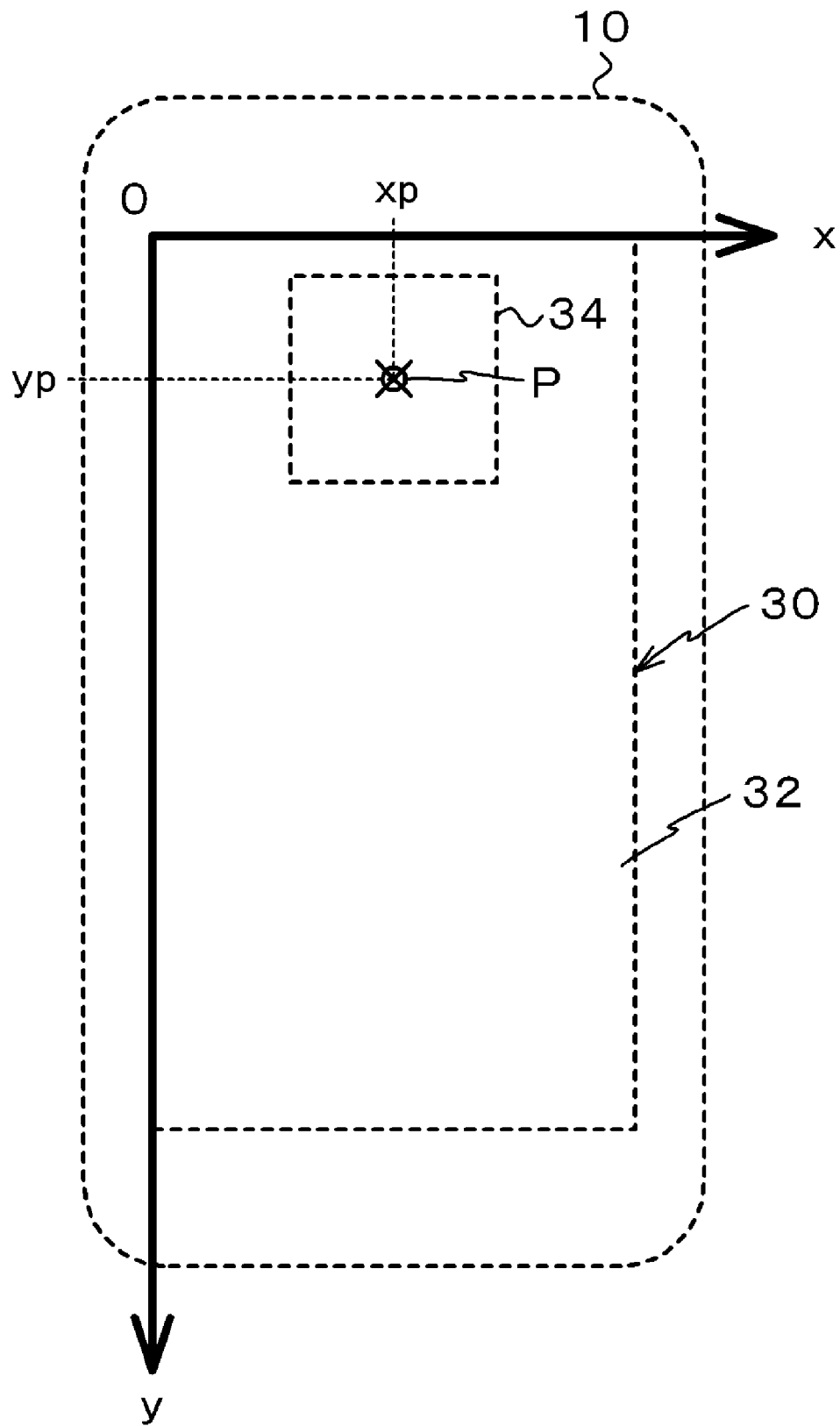
FIG. 8 is a diagram illustrating a coordinate system configured in a display.

The position information of the power supply coil 34 is expressed as a coordinate system configured in the display screen of the display 32. For example, in the case where an xy coordinate system is configured in the display 32 with the upper-left corner of the display screen serving as the origin as illustrated in FIG. 8, the position information of the power supply coil 34 is given as positional coordinates (xp,yp) of a center P of the power supply coil 34 in the xy coordinate system. This position information is configured for the communication terminal 10 on a model-by-model basis and is stored in the auxiliary storage unit 52 in advance.

In the present preferred embodiment, the CPU 50, the main storage unit 51, and the auxiliary storage unit 52 configure a computer that controls the communication terminal 10 as a whole.

The control board 40 and the interface 30 are contained within the housing 20 configured of the front panel 21, the frame 22, and the rear panel 23, as illustrated in FIG. 2. In the communication terminal 10, the touch panel 31 of the interface 30 and the key tops of the pushbuttons 55 mounted on the control board 40 are exposed through the openings 21a-21d in the front panel 21 as illustrated in FIG. 1.

When using the communication terminal 10 to carry out near-field communication (NFC), the front surface of the communication terminal 10 is brought close to an external device that serves as the subject of communication. At this time, the display 32 that configures the interface 30 displays the position of the power supply coil 34 in response to the user of the communication terminal 10 manipulating a pushbutton 55 or the touch panel 31. Display operations performed by the communication terminal 10 will be described next with reference to FIG. 9.

Figure 9:
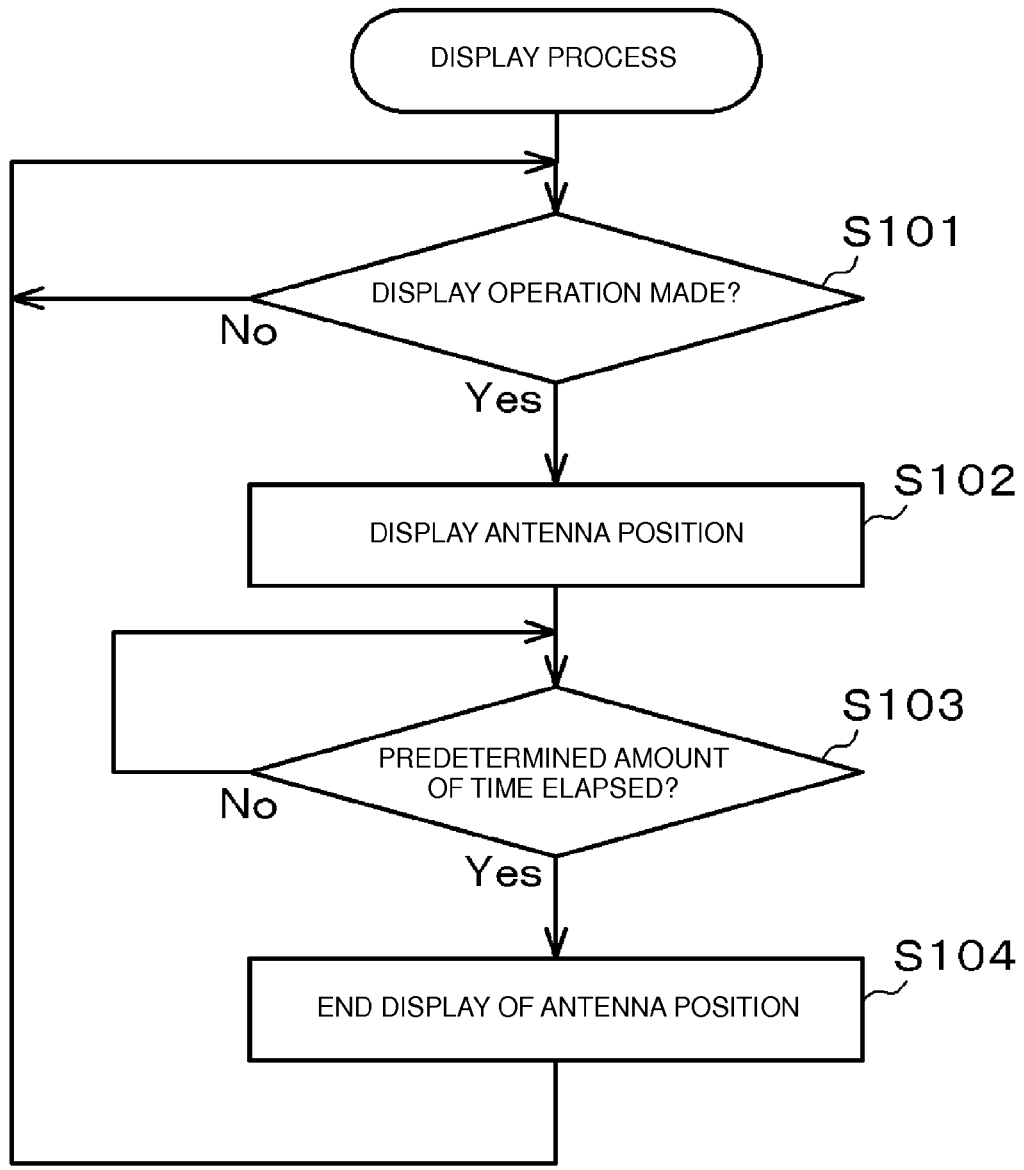
FIG. 9 is a flowchart illustrating a series of display processing executed by a CPU.

FIG. 9 is a flowchart illustrating a series of display processing executed by the CPU 50 of the communication terminal 10 with respect to a smartcard reading process performed by the communication terminal 10. This flowchart corresponds to an algorithm of a program executed by the CPU 50. The display processing illustrated in the flowchart is started when the communication terminal 10 is turned on.

In the first step S101, the CPU 50 stands by for a display command from the user. A specific pushbutton 55 being manipulated, a pushbutton 55 being held down for approximately two seconds, for example, or an icon being manipulated through the touch panel 31 can be considered as examples of the display command from the user. Upon receiving the display command from the user (step S101: Yes), the CPU 50 moves to the following step S102.

Figure 10:
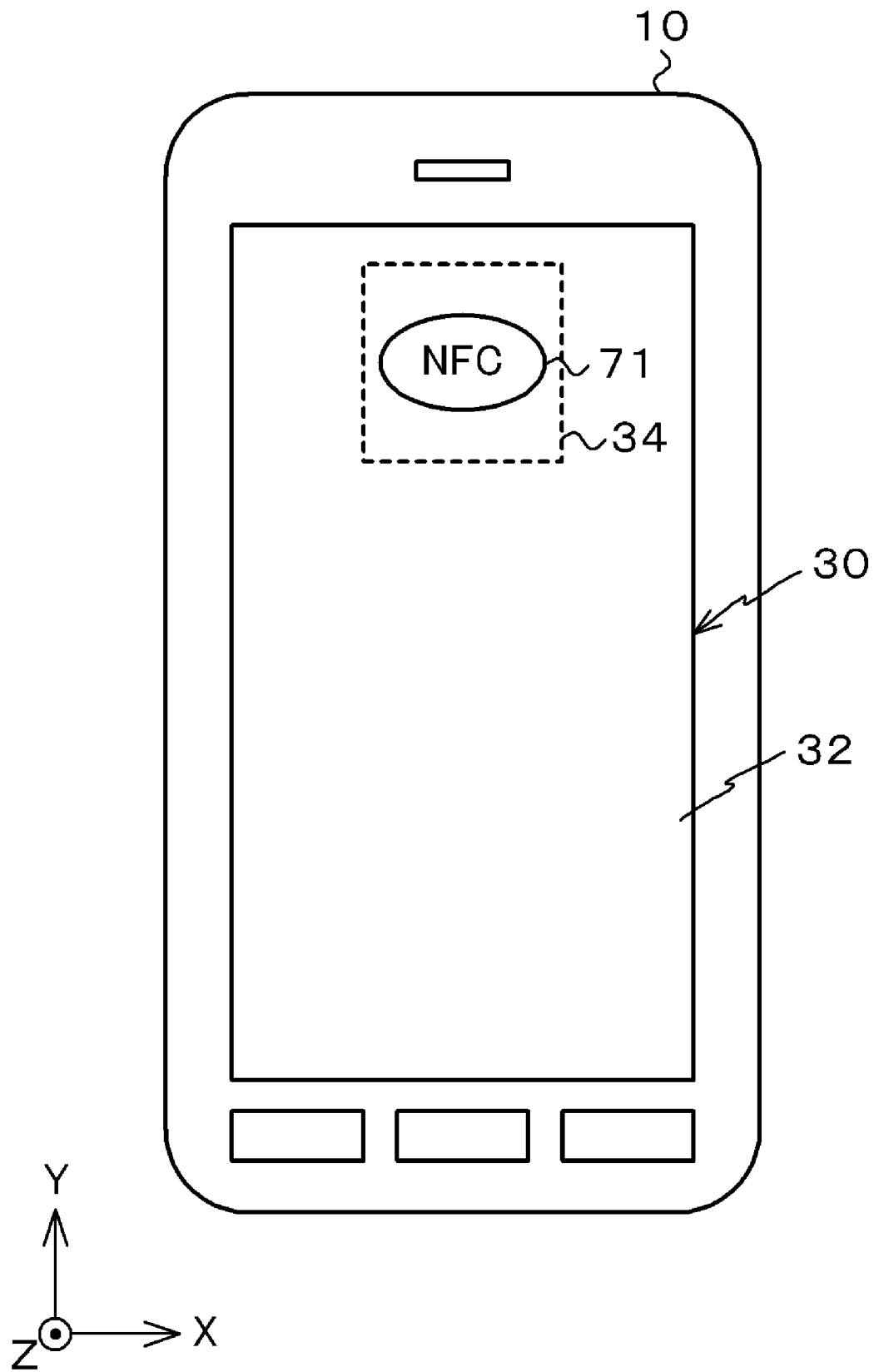
FIG. 10 is a diagram illustrating a mark displayed in a display.

In step S102, the CPU 50 reads out the positional coordinates (xp,yp) of the power supply coil 34 from the auxiliary storage unit 52. Then, as illustrated in FIG. 10, a mark 71 positioned in the center of the positional coordinates (xp,yp) is displayed in the display 32. This enables the user to identify the position of the power supply coil 34 based on the position of the mark 71 and bring the most sensitive area of the power supply coil 34 (the center P of the power supply coil 34) close to the smartcard. The CPU 50 issues, to the RFIC 70, a command for setting the RFIC 70 into a receiving state at the same time as the mark 71 is displayed.

Figure 11:
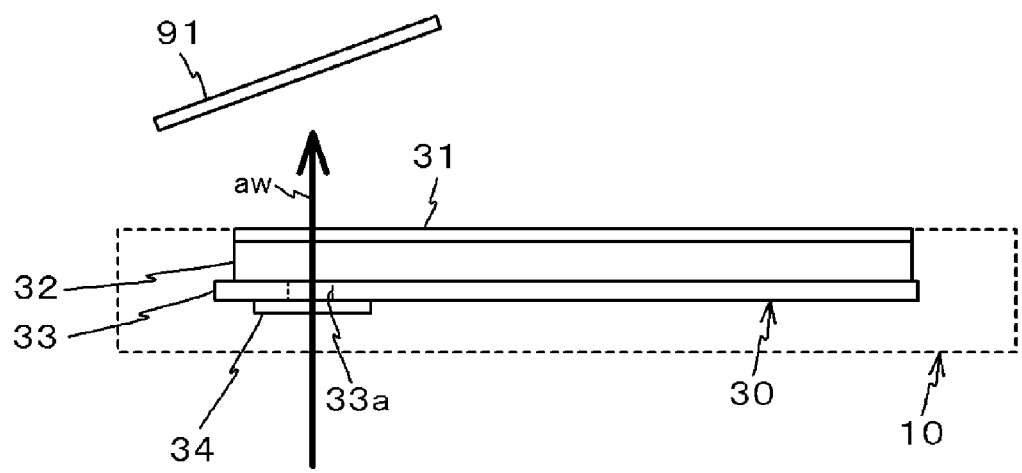
FIG. 11 is a diagram illustrating a communication terminal communicating with a smartcard positioned in front of a display.
Figure 12:
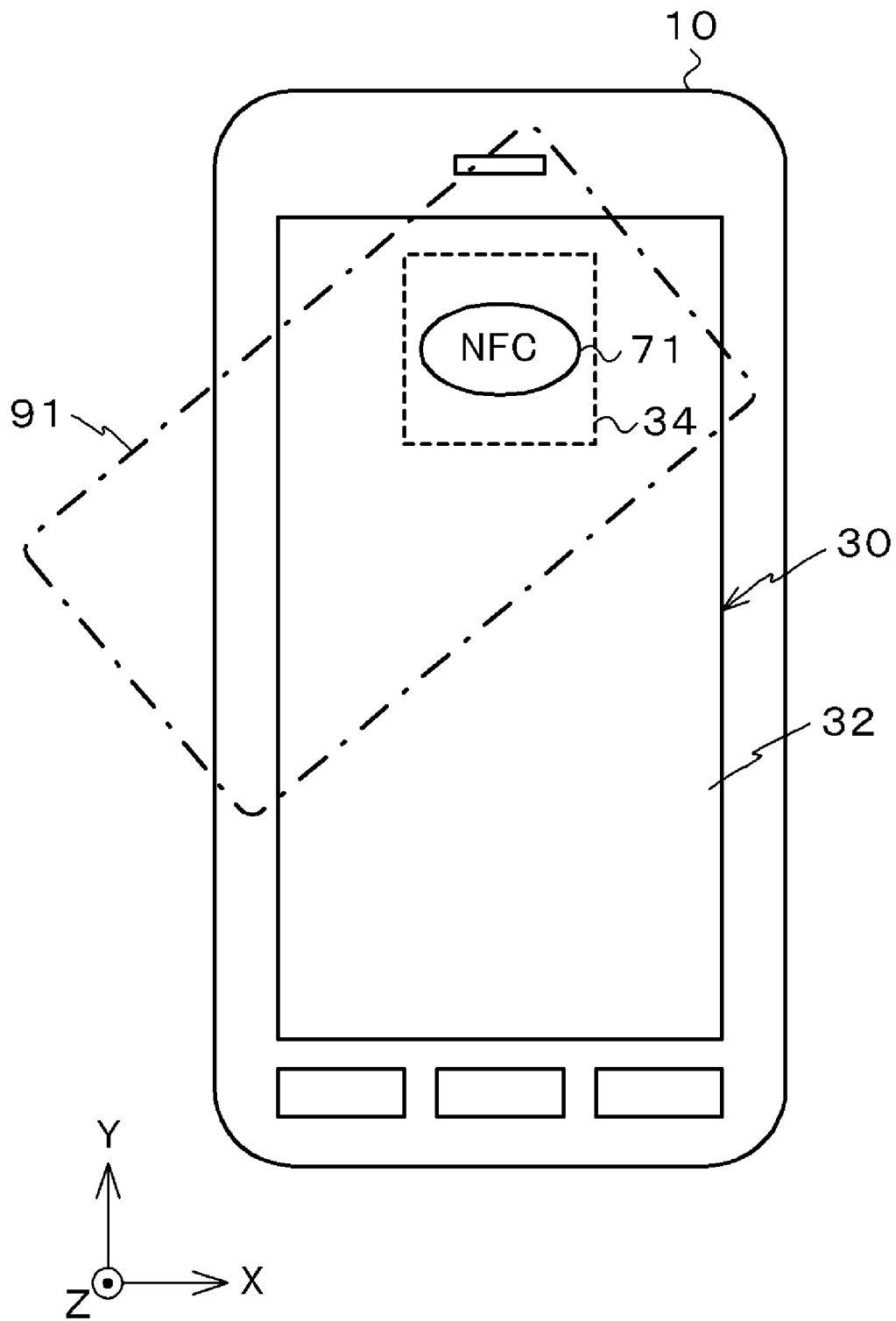
FIG. 12 is a diagram illustrating a communication terminal communicating with a smartcard positioned in front of a display.

As illustrated in FIGS. 11 and 12, when a smartcard 91 is brought within the communication range of the communication terminal 10, the RFIC 70 communicates with the smartcard 91 via the power supply coil 34 and the shield plate 33 defining and acting as a booster electrode for the power supply coil 34. When a current modulated based on sending information flows in the power supply coil 34 of the communication terminal 10, a magnetic flux emitted from the power supply coil 34 traverses the opening 33a in the shield plate 33, as indicated by an arrow aw in FIG. 11. As a result, the power supply coil 34 and the shield plate 33 are electromagnetically coupled and the shield plate 33 defines and functions as an antenna.

When the communication terminal 10 receives a magnetic field from the smartcard 91, the magnetic flux strengthened by the induced current flowing along the edge of the shield plate traverses the coil opening portion 34d of the coil pattern 34a that configures the power supply coil 34. As a result, the power supply coil 34 and the shield plate 33 are electromagnetically coupled and the shield plate 33 defines and functions as an antenna. Accordingly, the communication terminal communicates favorably with the smartcard 91 positioned on the front surface side of the display 32.

Next, in step S103, the CPU 50 measures an amount of time elapsed since the mark 71 was initially displayed. When it is determined that the necessary communication is complete or that a predetermined amount of time has elapsed since the mark was initially displayed (step S103: Yes), the processing moves to the following step S104.

In step S104, the CPU 50 terminates the display of the mark 71. In the case where the communication was not complete, the processing returns to step S101, and the processes of steps S101-S104 are then repeated.

According to the present preferred embodiment as described thus far, the power supply coil 34 is disposed on the rear surface of the display 32 via the shield plate 33. When a current flows in the power supply coil 34, the magnetic flux emitted from the power supply coil 34 traverses the opening 33a of the shield plate 33. As a result, the power supply coil 34 and the shield plate 33 are electromagnetically coupled and the shield plate 33 defines and functions as an antenna. When the communication terminal 10 receives a magnetic field from an external device such as the smartcard 91 or the like, the magnetic flux strengthened by the induced current flowing along the edge of the shield plate 33 traverses the coil opening portion 34*d* of the coil pattern 34*a* that configures the power supply coil 34. As a result, the power supply coil 34 and the shield plate 33 are electromagnetically coupled and the shield plate 33 defines and functions as an antenna. Accordingly, the communication terminal 10 held by the user communicates favorably with the external device positioned on the front surface side of the display 32.

The power supply coil 34 is disposed on the rear surface of the display 32 in the present preferred embodiment. Thus, a small, thin planar coil is used as the power supply coil 34. Accordingly, favorable communication is carried out with the external device positioned on the front surface side of the display 32 without complicating the apparatus.

In the present preferred embodiment, the communication terminal 10 displays the mark 71 indicating the position of the power supply coil 34 in the display 32 as illustrated in FIG. 10, in response to the user of the communication terminal 10 performing a display operation in the communication terminal 10. As a result, the user is able to identify the position of the power supply coil 34 based on the position of the mark 71 and brings the most sensitive portion of the power supply coil 34 (a hot spot) close to the external device that is the subject of communication in a precise manner. This makes it possible to communicate favorably with the external device.

According to the present preferred embodiment, the power supply coil 34 of the communication terminal 10 is configured to be brought close to the external device in a precise manner. As such, favorable communication with the external device is possible even when the power supply coil 34 has a short communication range. This enables a reduction in the size of the power supply coil 34 provided in the communication terminal 10.

Meanwhile, when a current flows in the power supply coil 34, the induced current flowing in the end portion of the shield plate 33 and the current flowing in the coil pattern 34*a* interact with each other, and thus the shield plate 33 provides the same function as an antenna having the same size as the shield plate 33. Accordingly, a useful communication range of a certain size is ensured even if the power supply coil 34 is reduced in size.

According to the present preferred embodiment, the mark 71 indicating the position of the power supply coil 34 is displayed in the display 32 of the communication terminal 10. It is therefore unnecessary to provide a mark indicating the position of the power supply coil 34 on the main body (and particularly on the rear panel) of the communication terminal 10 itself or on the touch panel 31 itself. This increases the freedom with which the communication terminal 10 is able to be designed.

Furthermore, in the case where the position of the power supply coil 34 in the communication terminal 10 is changed for design purposes, the mark 71 indicating the post-change position of the power supply coil 34 is displayed in the display simply by updating the position information of the power supply coil 34 stored in the auxiliary storage unit 52. This makes it possible to reduce costs involved in the design of the communication terminal 10. It also increases the freedom with which the communication terminal 10 is designed.

According to the present preferred embodiment, the communication terminal 10 communicates with an external device via the display 32. Accordingly, a metal material such as aluminum, a magnesium alloy, or stainless steel, a material such as carbon fiber, or the like can be used for the housing 20 (and the rear panel in particular) of the communication terminal 10. This makes it possible to increase the strength of the communication terminal 10 and increase the freedom of design. Furthermore, the inductance of the power supply coil 34 is increased by affixing a magnetic sheet on the top surface of the power supply coil 34 so as to cover the power supply coil 34. Noise leaking from the opening 33*a* in the shield plate 33 is also blocked by the magnetic sheet.

Figure 13:
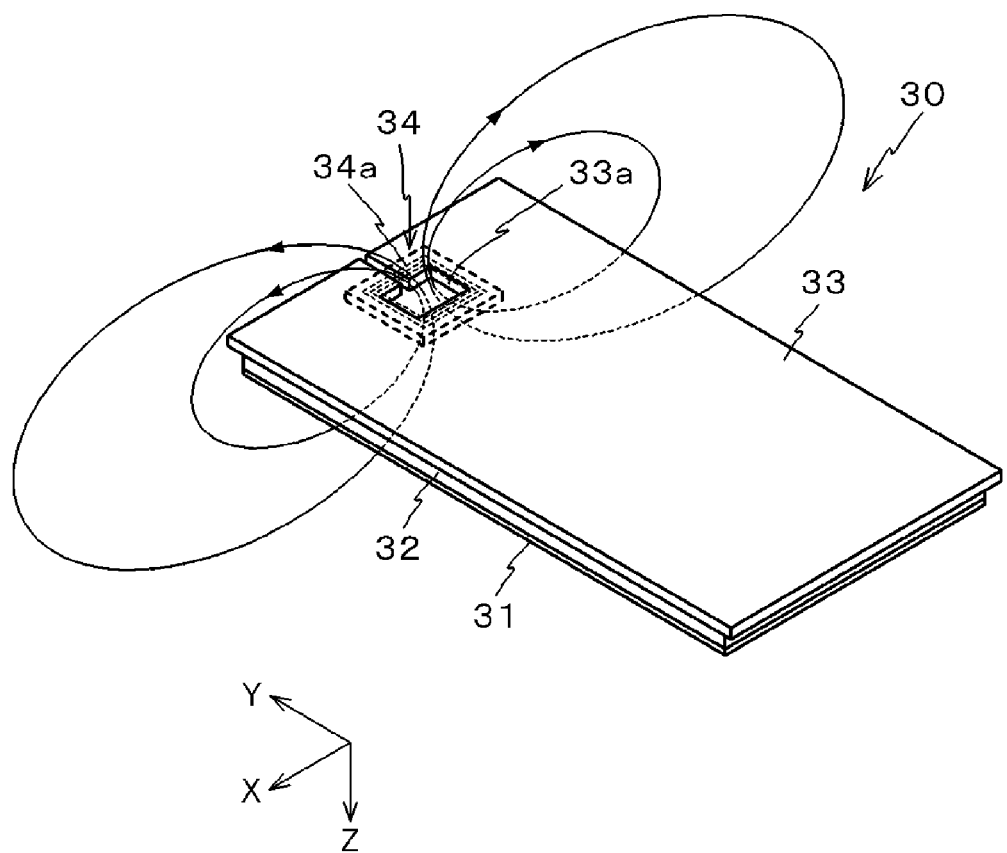
FIG. 13 is a diagram illustrating a magnetic flux produced by a power supply coil.
Figure 14:
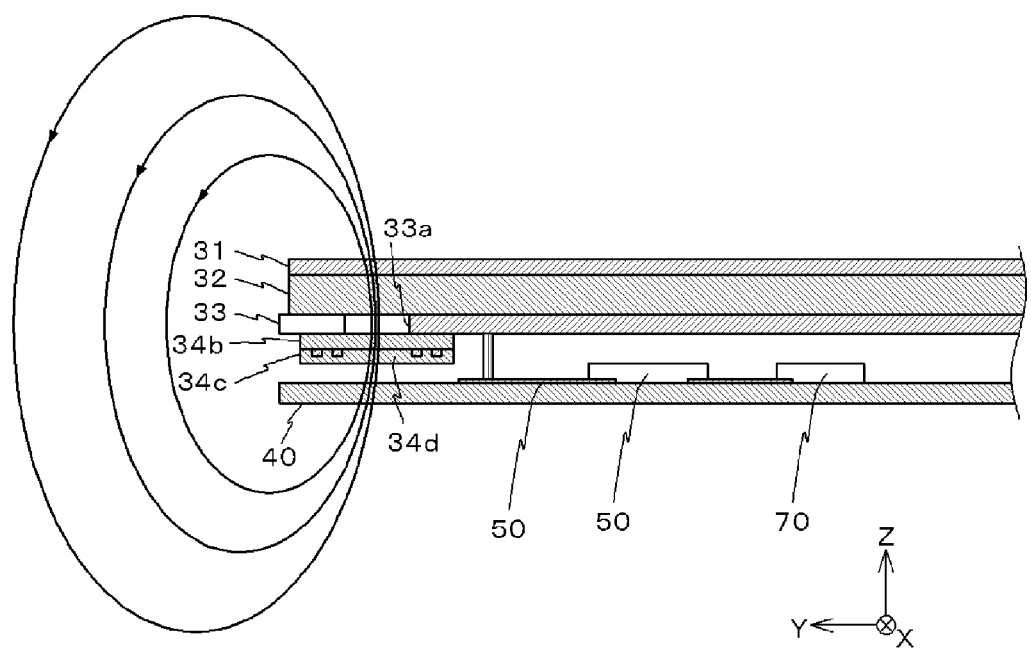
FIG. 14 is a diagram illustrating a magnetic flux produced by a power supply coil.
Figure 15:
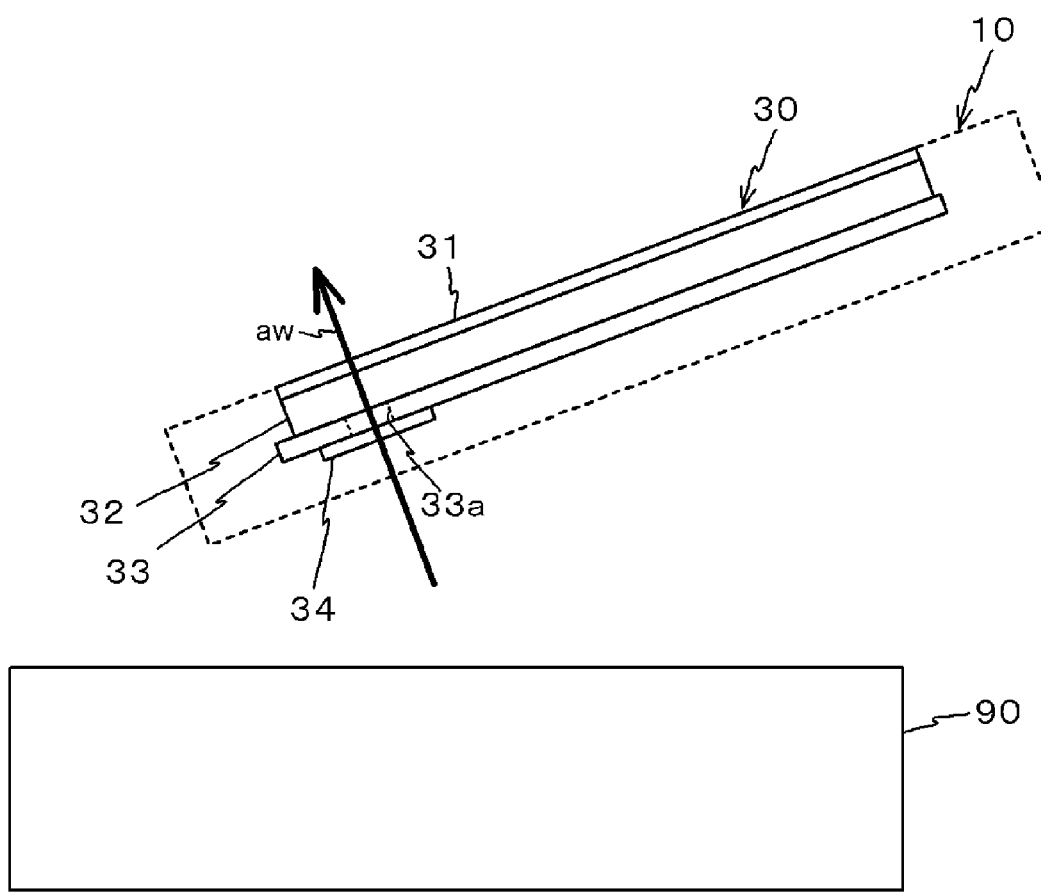
FIG. 15 is a diagram illustrating a communication terminal communicating with an external device positioned in front of a display.

According to the present preferred embodiment, magnetic flux lines representing the magnetic flux produced when a current flows in the coil pattern 34*a* of the power supply coil pass through the opening 33*a* in the shield plate 33 and circulate the outer edge of the shield plate 33 in an oval shape as illustrated in FIGS. 13 and 14, in the case where there is no metal body to block the magnetic flux on the −Z side of the power supply coil. In this manner, when a current flows in the coil pattern 34*a*, a magnetic flux that passes through the opening 33*a* in the shield plate 33 is produced. As a result, the interface 30 electromagnetically couples and communicates not only with the smartcard 91 positioned on the front surface side of the display 32 as illustrated in FIG. 11, but also with an external device 90 positioned on the rear surface side of the display 32 as illustrated in FIG. 15. Accordingly, it is possible to communicate with the external device 90 positioned at the front surface or the rear surface of the display 32 while the shield plate 33 protects the display 32. The mark 71 is displayed in the display 32 even in this case, or in other words, even in the case where the rear surface side serves as a communication partner side.

According to the foregoing preferred embodiment, the communication terminal 10 preferably is be used as a reader/writer that reads/writes information from/to the smartcard 91. In this case, the information read by the communication terminal 10 is transferred to an external server via a network such as a LAN or the like. In addition to a smartphone, any electronic device that includes a liquid crystal panel and is able to communicate with an external server, such as a tablet terminal, a laptop computer, a television, or the like, is considered as the communication terminal 10 used as a reader/writer for the smartcard 91.

Second Preferred Embodiment

Next, a second preferred embodiment of the present invention will be described with reference to the drawings. Note that the same reference numerals are used for elements identical or corresponding to those of the first preferred embodiment.

Figure 16:
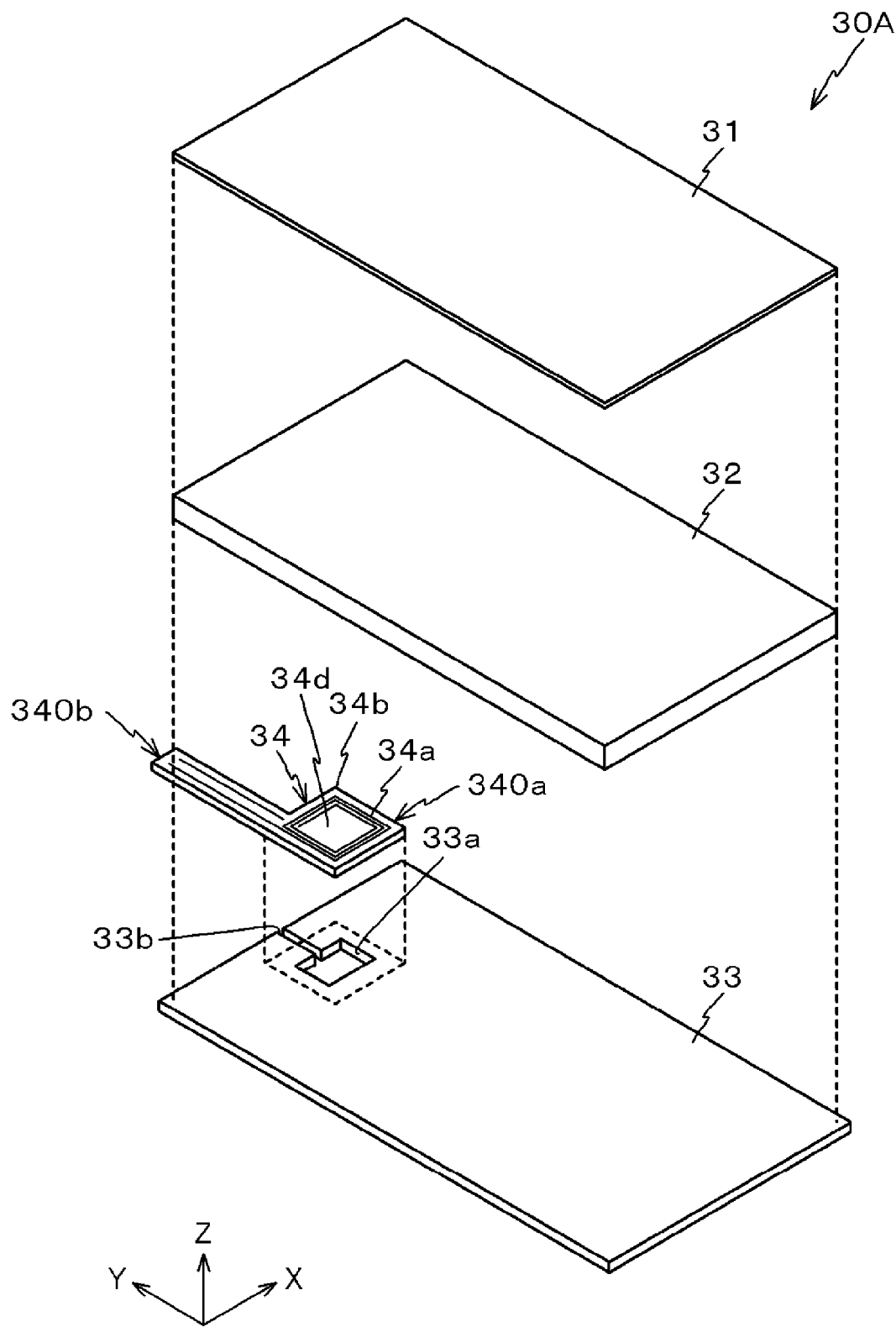
FIG. 16 is an exploded perspective view of an interface according to a second preferred embodiment of the present invention.

As illustrated in FIG. 16, an interface 30A differs from the interface 30 according to the first preferred embodiment in that the power supply coil 34 is positioned between the display 32 and the shield plate 33.

The power supply coil 34 according to the present preferred embodiment includes a square main body portion 340*a* including the coil pattern 34*a* and a rectangular or substantially rectangular extending portion 340*b* extending from the main body portion 340*a* in the +Y direction. The extending portion 340*b* is flexible and therefore greatly deforms by bending or the like. The main body portion 340*a* includes the coil pattern 34*a*, and the extending portion 340*b* includes a lead wire that connects the coil pattern 34*a* to the RFIC 70 provided on the control board 40.

As illustrated in FIG. 16, the power supply coil 34 is disposed on the top surface (the +Z side surface) of the shield plate 33 so that the center of the coil pattern 34*a* matches the center of the opening 33*a* in the shield plate 33. As a result, the coil opening portion 34*d* of the coil pattern 34*a* at least partially overlaps with the opening 33*a* in the shield plate 33. In other words, the power supply coil 34 is disposed so that the coil opening portion 34d is at least partially exposed in the direction opposite the display 32 (in the −Z direction) from the shield plate 33. The display 32 and the touch panel 31 are disposed in that order on the top surface of the shield plate 33 on which the power supply coil 34 is disposed.

Figure 17:
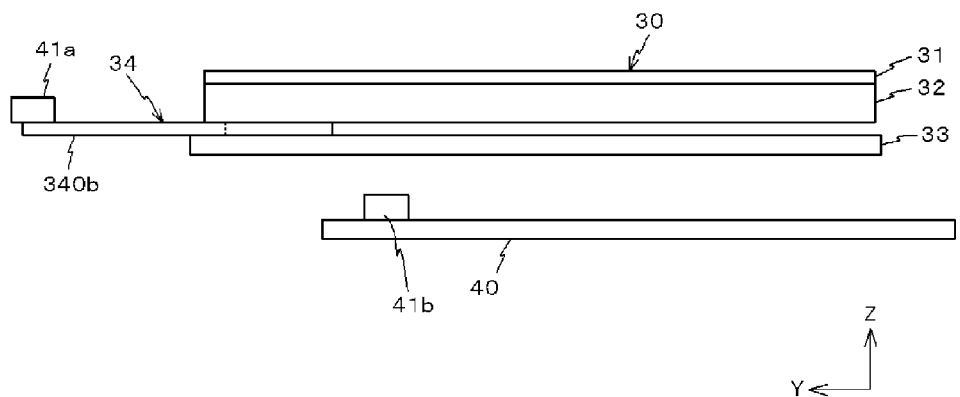
FIG. 17 is a side view of an interface.

In the interface 30A configured as described above, the extending portion 340b of the power supply coil 34 protrudes in the +Y direction from between the display 32 and the shield plate 33, as illustrated in FIG. 17. The extending portion 340b provided in the power supply coil 34 is bent so that one end portion thereof wraps around to the bottom surface of the shield plate 33, as illustrated in FIG. 15. A connector 41a provided at an end portion of the lead wire in the extending portion 340b is inserted into a connector 41b provided on the control board 40. Through this, the power supply coil 34 configures the control system 60, as illustrated in FIG. 7.

As described thus far, according to the present preferred embodiment, the power supply coil 34 is disposed on the rear surface side of the display 32, and more specifically, between the display 32 and the shield plate 33. When a current flows in the power supply coil 34, the magnetic flux emitted from the power supply coil 34 traverses the opening 33a of the shield plate 33. As a result, the power supply coil 34 and the shield plate 33 are electromagnetically coupled and the shield plate 33 defines and functions as an antenna. When the communication terminal 10 receives a magnetic field from the external device 90, the magnetic flux strengthened by the induced current flowing along the edge of the shield plate 33 traverses the coil opening portion 34d of the coil pattern 34a that configures the power supply coil 34. As a result, the power supply coil 34 and the shield plate 33 are electromagnetically coupled and the shield plate 33 defines and functions as an antenna. Accordingly, the communication terminal 10 communicates favorably with the external device positioned on the front surface side or the rear surface side of the display 32.

Figure 18:
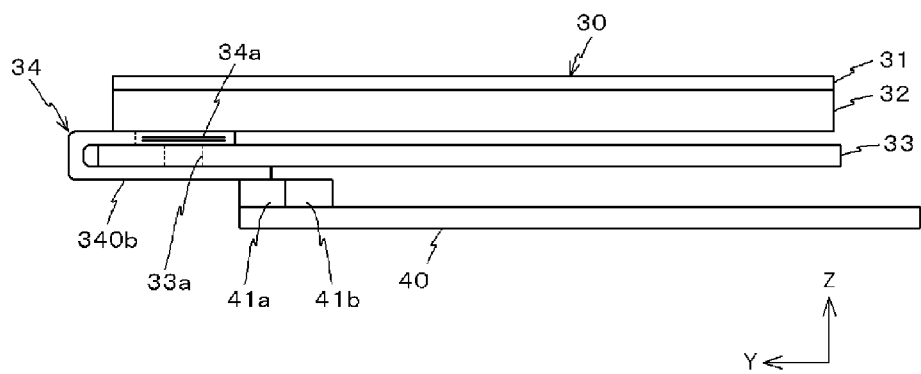
FIG. 18 is a side view of an interface.

In the interface 30A according to the present preferred embodiment, the control board 40 is disposed so as not to overlap with the opening 33a in the shield plate 33, as illustrated in FIG. 18. As a result, degradation in antenna characteristics caused by unnecessary coupling with electronic devices mounted on the control board 40, the power supply coil 34, and the like is significantly reduced or prevented when communicating with the external device. Note that it is possible to communicate with the external device even when the control board 40 overlaps with the opening 33a of the shield plate 33.

Figure 19:
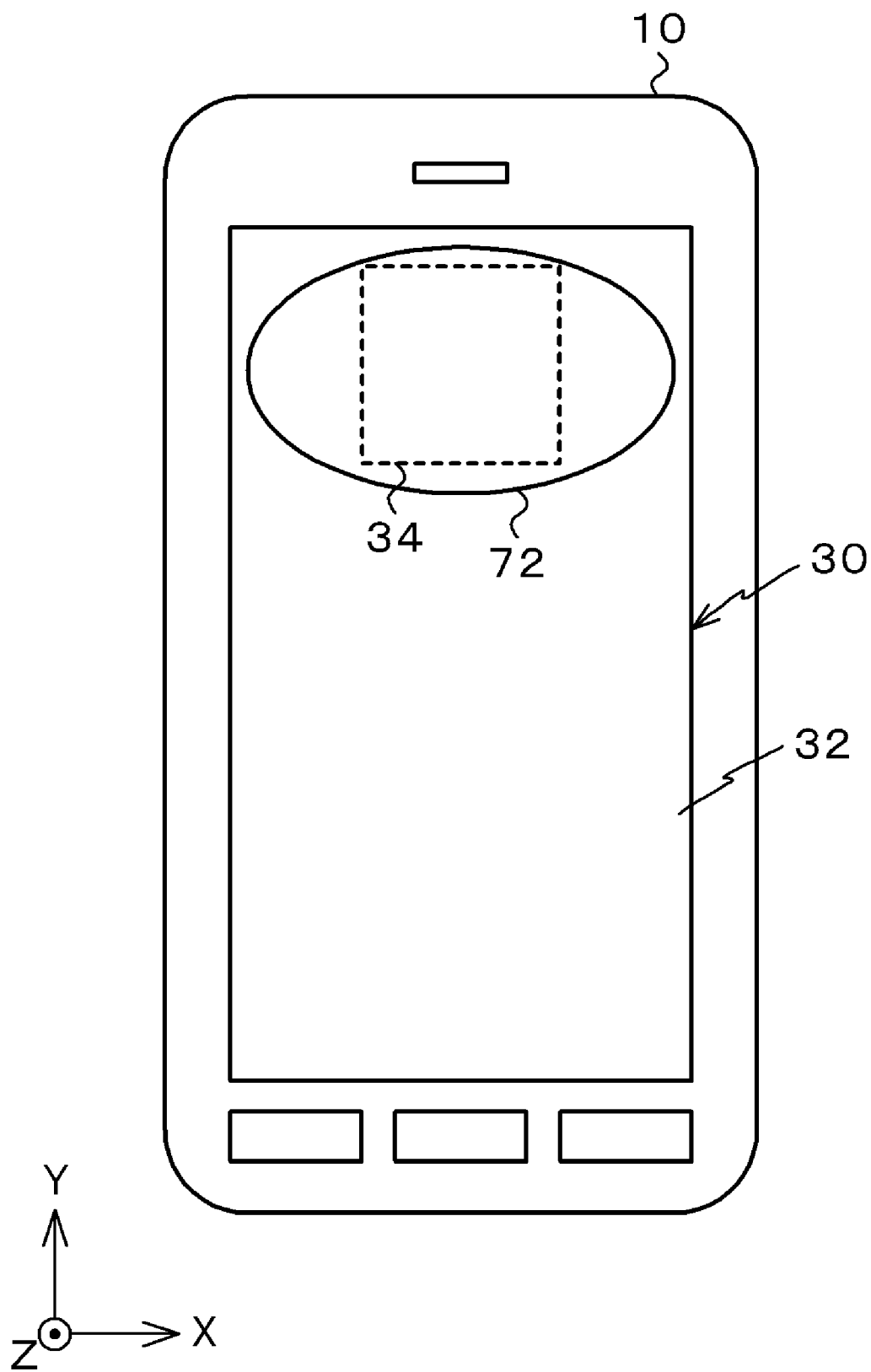
FIG. 19 is a diagram illustrating a variation on a mark displayed in a display.

Although preferred embodiments of the present invention have been described thus far, the present invention is not intended to be limited to the foregoing preferred embodiments. For example, the mark 71 that matches the center of the power supply coil 34 is described in the foregoing preferred embodiments as preferably being displayed in the display 32 of the communication terminal 10, as illustrated in FIG. 10. However, the present invention is not limited thereto, and a mark 72 indicating the useful communication range of the power supply coil 34 or a hot spot may be displayed in the display 32 of the communication terminal 10, as illustrated in FIG. 19.

In the foregoing preferred embodiment, the mark 71 is described as preferably being displayed in the display 32 in the case where the user holding the communication terminal 10 makes a display operation (step S101: Yes). However, the present invention is not limited thereto, and the mark 71 may be displayed in the display 32 of the communication terminal 10 in the case where an application for near-field communication using a technique such as FeliCa (registered trademark) has been launched, for example.

Figure 20:
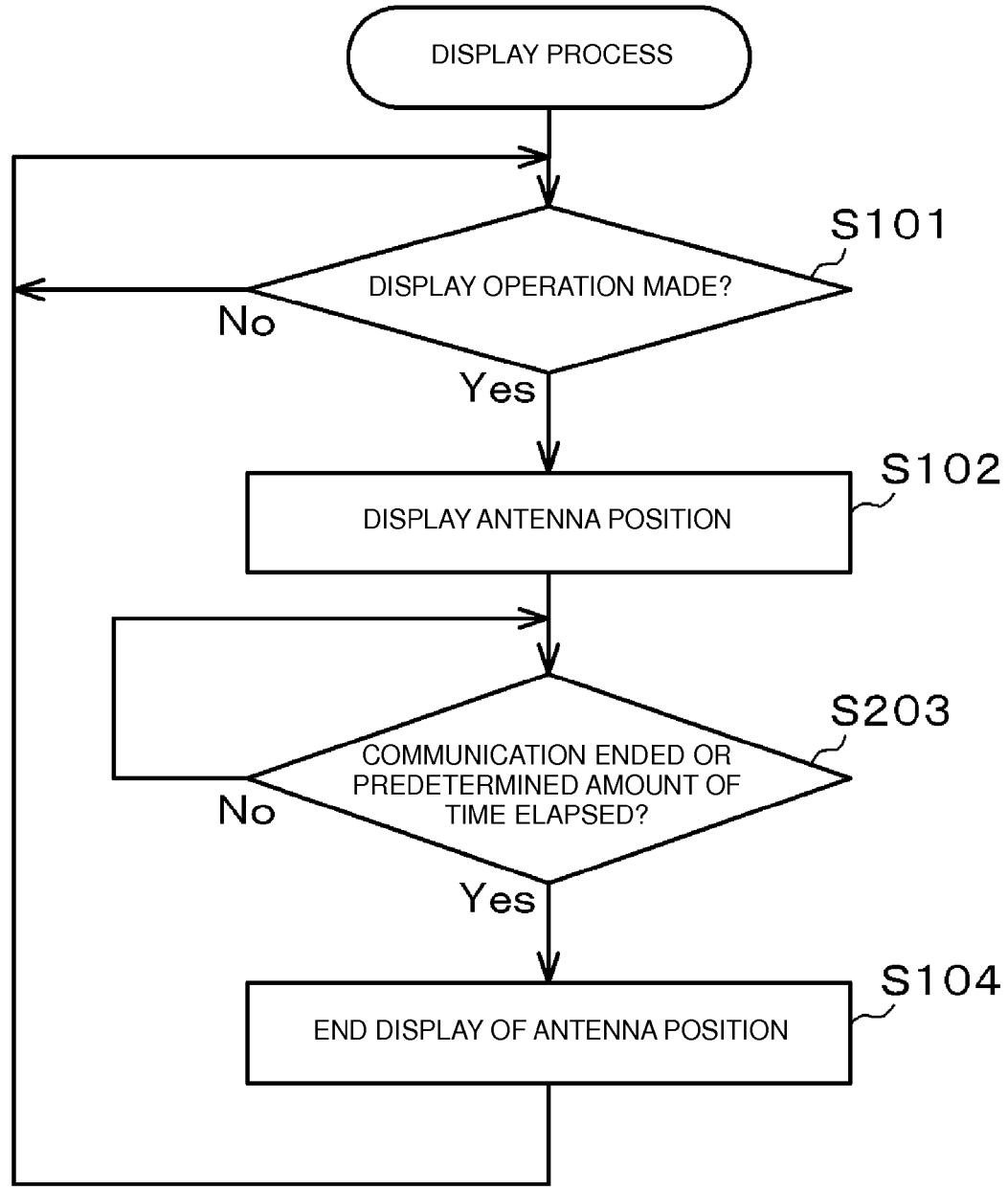
FIG. 20 is a flowchart illustrating a variation on a display process.

Meanwhile, after the position of the power supply coil has been displayed (step S102), in the case where the communication with the external device has ended or the predetermined amount of time has elapsed (step S203), the display of the position of the power supply coil 34 may be terminated (step S104) as illustrated in FIG. 20.

The foregoing preferred embodiments describe cases where the communication terminal 10 is a smartphone. However, the present invention is not limited thereto, and the communication terminal 10 may be any device having a communication function, such as a cellular phone that does not have a GUI, a tablet terminal, a laptop computer, or the like.

Figure 21:
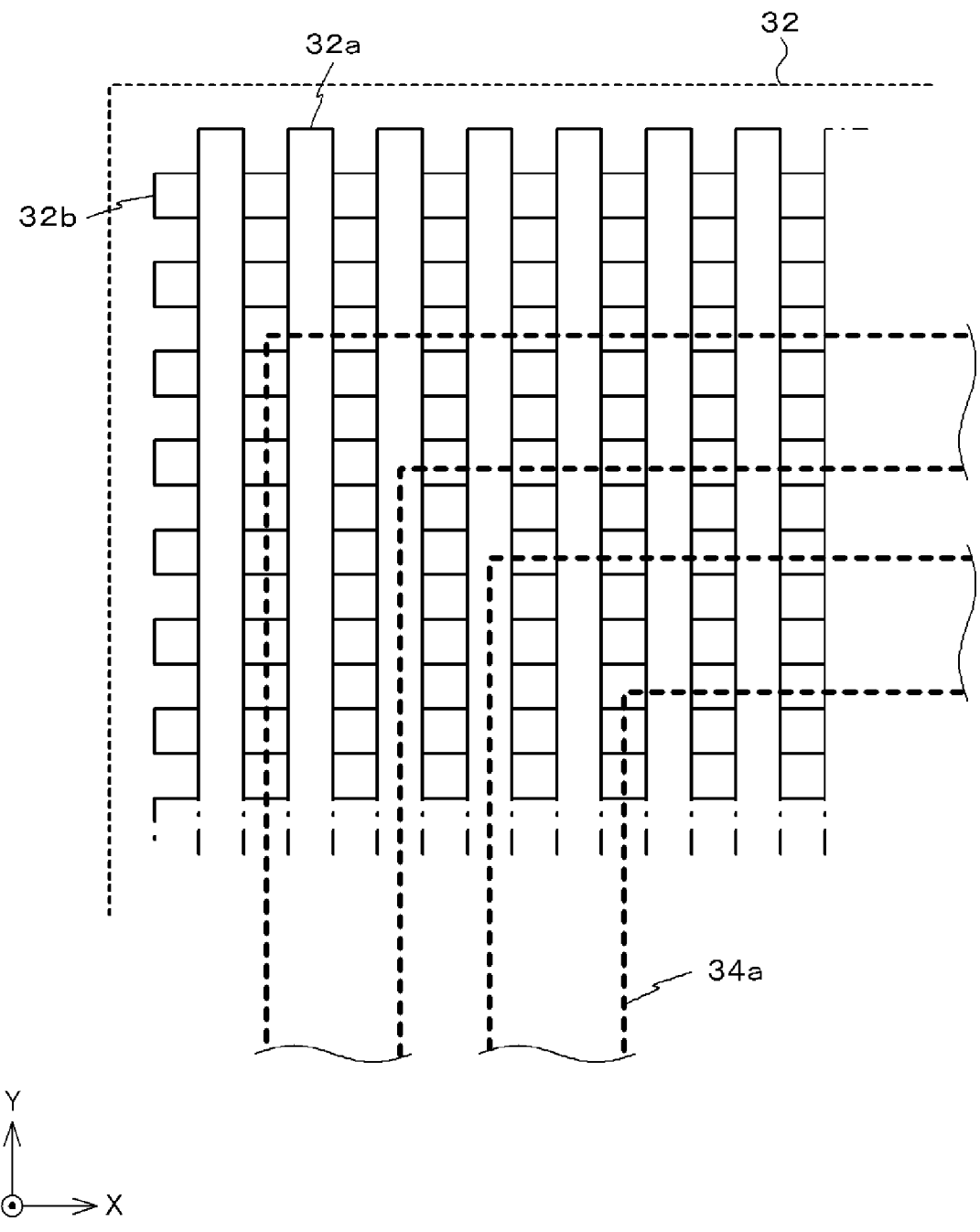
FIG. 21 is a diagram illustrating transparent electrodes of a display.

The foregoing preferred embodiments describe cases where the display 32 preferably is a liquid crystal panel. As illustrated in FIG. 21, the electrodes of the display 32 include transparent electrodes 32a arranged at equal or substantially equal intervals in the X axis direction and transparent electrodes 32b arranged at equal or substantially equal intervals in the Y axis direction opposing the transparent electrodes 32a. The transparent electrodes 32a and 32b are considerably thinner than the diameter of the opening in the coil pattern 34a that configures the power supply coil 34. Further, the transparent electrodes 32a and the transparent electrodes 32b are insulated from each other with respect to DC current. Induced current produced due to the effects of magnetic fields on the transparent electrodes 32a and 32b thus does not flow between the different transparent electrodes. In other words, the electrodes consume almost none of the magnetic field produced by the power supply coil 34 as induced current.

As such, the magnetic flux from the power supply coil 34 is not significantly affected by the induced current produced in the transparent electrodes 32a and 32b, and reaches the external device positioned on the front surface side of the display 32 via gaps between the transparent electrodes 32a and gaps between the transparent electrodes 32b. The communication terminal 10 therefore communicates wirelessly with the external device in a favorable manner.

Compared to the coil pattern 34a and the shield plate 33, the transparent electrodes 32a and 32b have high resistance values (conductor resistance), and the resistance values of the transparent electrodes 32a and 32b are increased further by configuring the transparent electrodes 32a and 32b in a long, thin shape. Induced current flowing around the interior of the transparent electrodes 32a and 32b is further suppressed in this case, which in turn reduces the influence on the magnetic flux traversing the display 32.

The electrostatic capacitance-type touch panel 31 also includes transparent electrodes disposed at equal or substantially equal intervals in the X axis direction and transparent electrodes disposed at equal or substantially equal intervals in the Y axis direction. The magnetic flux from the power supply coil 34 therefore passes between these transparent electrodes. Accordingly, the communication terminal 10 communicates wirelessly with the external device positioned on the front surface of the display 32 in a favorable manner even with the touch panel 31 disposed on the front surface of the display 32.

Although the foregoing preferred embodiments describe the display 32 as preferably a liquid crystal panel, the present invention is not limited thereto. The display 32 may be an organic EL display, a plasma display, or the like, for example. In sum, the display 32 may be any matrix-driven flat-panel display, such as an active matrix-driven, a passive matrix-driven, or a simple matrix-driven display, and is not particularly limited as long as there are no conductors or resistive films completely covering the opening 33a provided in the shield plate 33.

The foregoing preferred embodiments describe cases where the interface 30 preferably is configured of the touch panel 31, the display 32, the shield plate 33, and the power supply coil 34. However, the present invention is not limited thereto, and the interface 30 may be configured only of the display 32, the shield plate 33, and the power supply coil 34.

Furthermore, the interface 30 does not necessarily have to include a GUI having the touch panel 31 and the display 32, and may include physical keys, such as a numerical keypad, instead of the touch panel 31.

Figure 22:
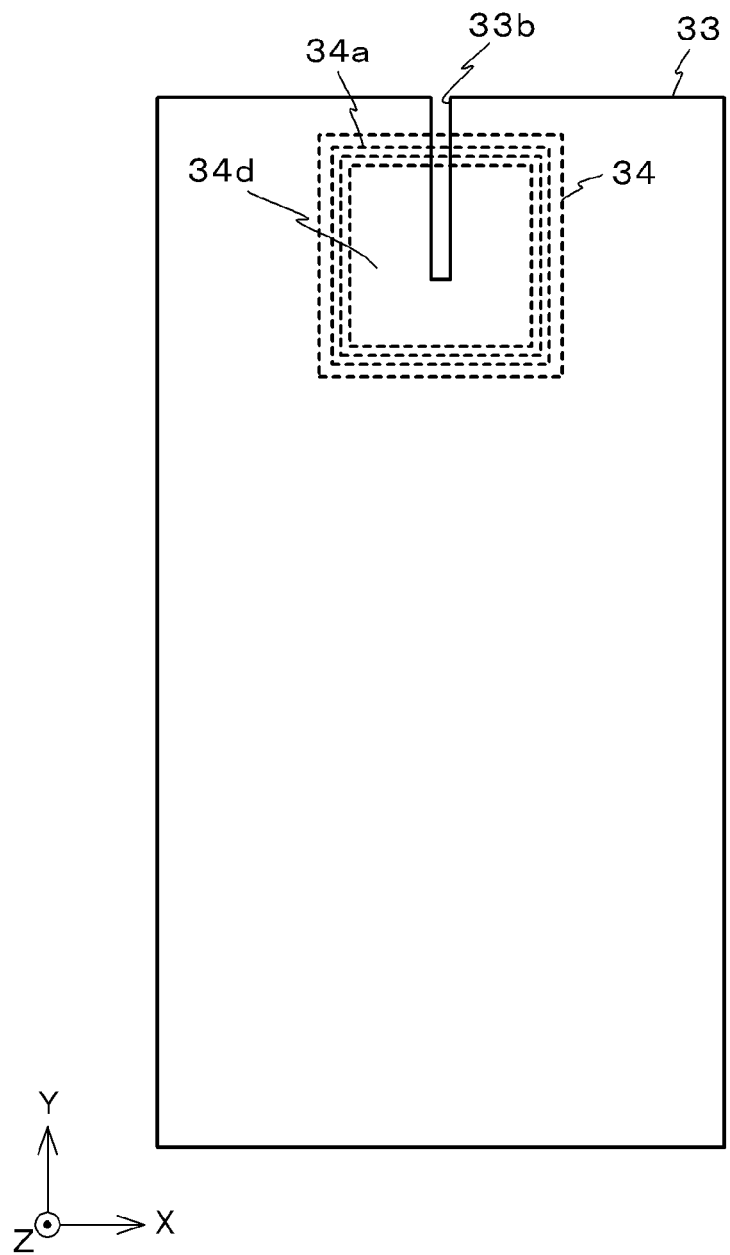
FIG. 22 is a diagram illustrating a slit provided in a shield plate.
Figure 23:
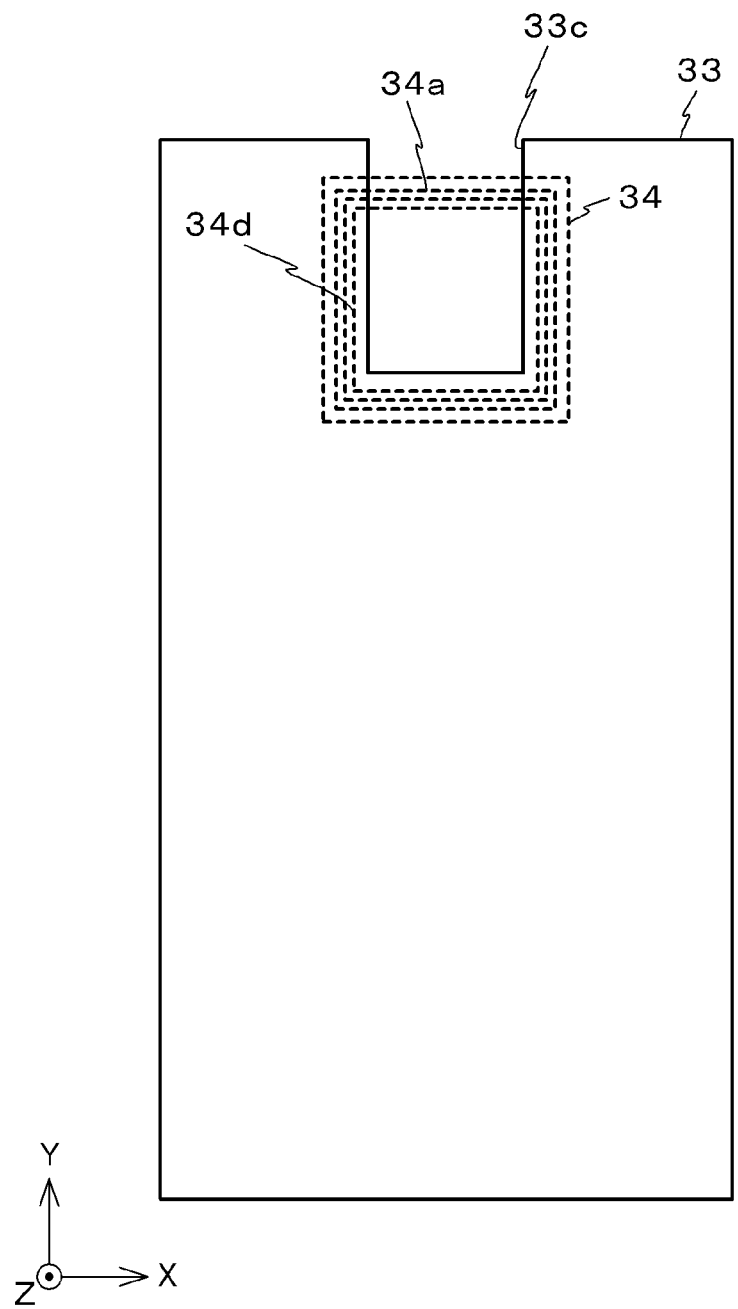
FIG. 23 is a diagram illustrating an opening portion provided in a shield plate.
Figure 24:
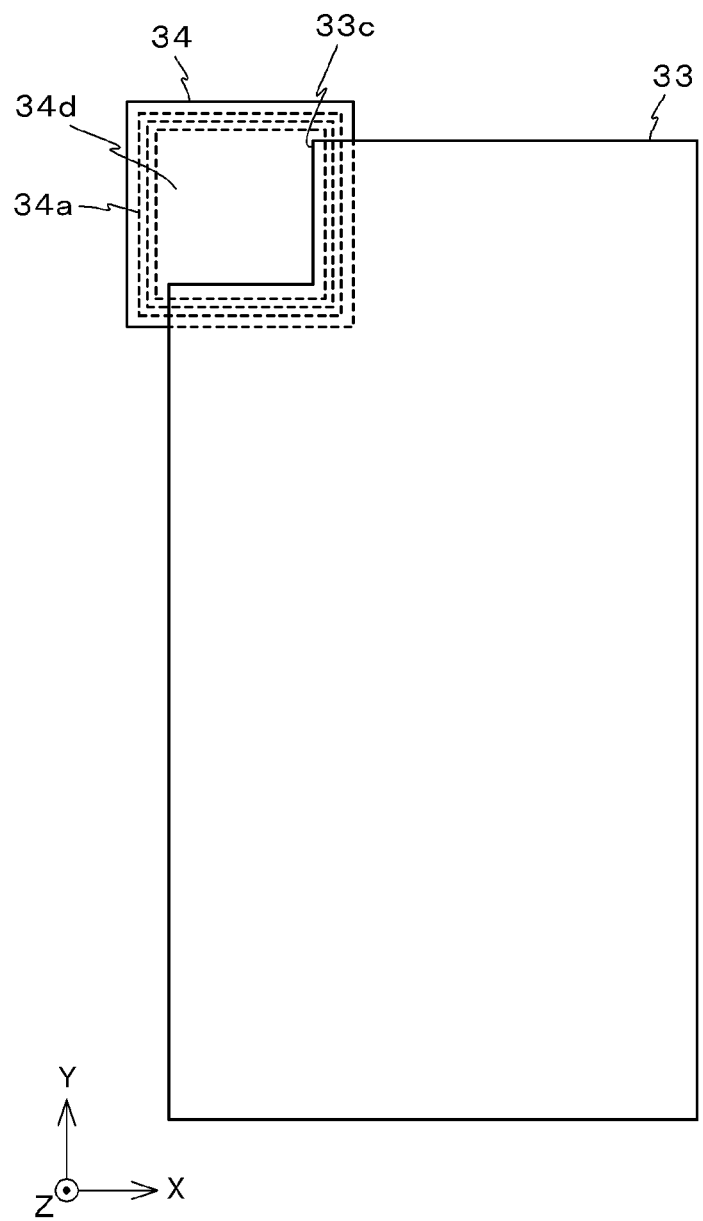
FIG. 24 is a diagram illustrating an opening portion provided in a shield plate.
Figure 25:
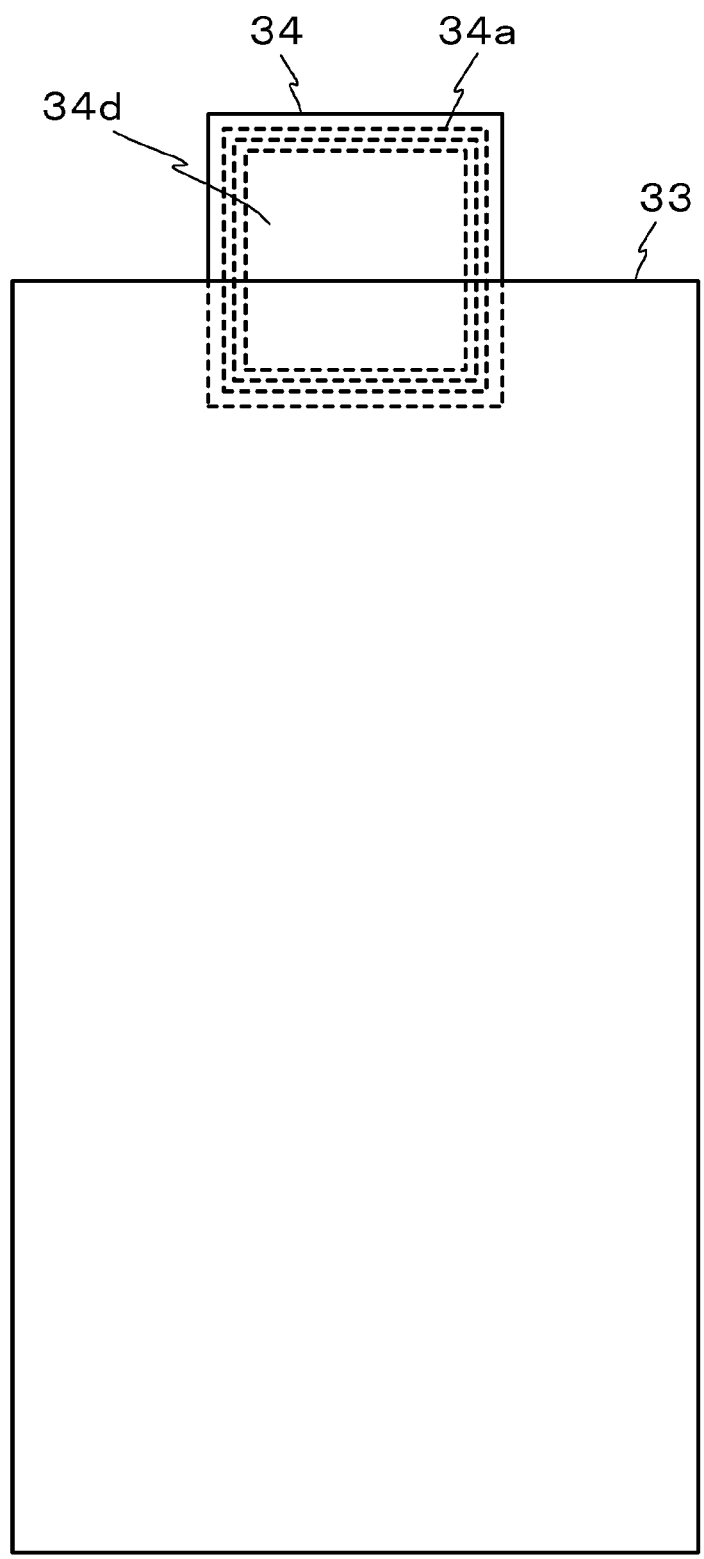
FIG. 25 is a diagram illustrating a positional relationship between a shield plate and a power supply coil.

The foregoing preferred embodiments describe cases where the opening 33a and the slit 33b are provided in the shield plate 33 as opening portions, as illustrated in FIGS. 3 and 16. The present invention is not limited thereto, and it is also possible, for example, to define only a rectangular or substantially rectangular slit 33b in the shield plate 33 so as to overlap with the coil opening portion 34d of the coil pattern 34a that configures the power supply coil 34, as illustrated in FIG. 22. In addition, an opening portion 33c that overlaps with the coil opening portion 34d of the coil pattern 34a that configures the power supply coil 34 may be provided in the shield plate 33, as illustrated in FIGS. 23 and 24. Furthermore, the power supply coil 34 may be disposed on a shield plate 33 in which the opening 33a, the slit 33b, and the like are not provided, so as not to at least partially overlap with the coil opening portion 34d in the coil pattern 34a that configures the power supply coil 34, as illustrated in FIG. 25. In other words, the power supply coil 34 may be disposed so that the coil opening portion 34d is at least partially exposed from the shield plate 33, as illustrated in FIG. 25.

In sum, it is sufficient for the power supply coil 34 to be disposed so that the coil opening portion 34d of the coil pattern 34a that configures the power supply coil 34 does not overlap with the shield plate 33 at least partially, even in the configurations illustrated in FIGS. 3, 16, and 22-25. In other words, it is sufficient for the power supply coil 34 and the shield plate 33 to be disposed so that the coil opening portion 34d of the coil pattern 34a in the power supply coil 34 is at least partially visible when the power supply coil 34 and the shield plate 33 are viewed from the side on which the display 32 serving as the display device is located.

The opening 33a, the slit 33b, and the opening portion 33c may be filled with a material having magnetic permeability, such as a resin.

Figure 26:
FIG. 26 is a diagram illustrating a power supply coil contained within an opening in a shield plate.
Figure 26:
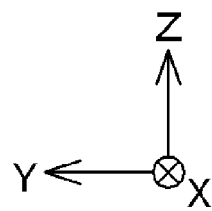

The foregoing preferred embodiments describe cases where the power supply coil 34 is preferably affixed to the surface of the shield plate 33, as illustrated in FIG. 4 or FIG. 17. However, the present invention is not limited thereto, and the power supply coil 34 may be disposed in the vicinity of the surface of the shield plate 33, or may be contained within the opening 33a in the shield plate 33 as illustrated in FIG. 26. The power supply coil 34 may alternatively be disposed on the printed circuit board side.

Figure 27:
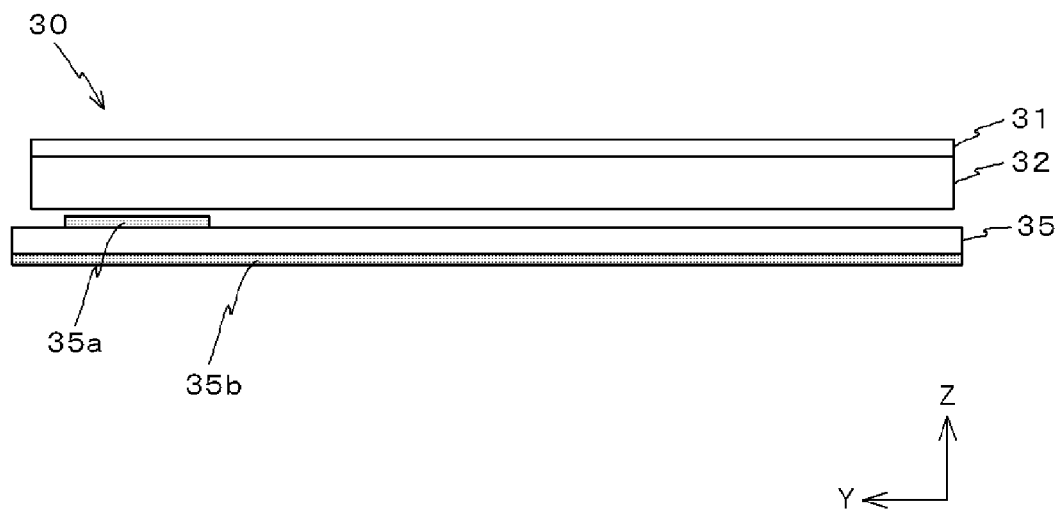
FIG. 27 is a diagram illustrating a variation on an interface.

The foregoing preferred embodiments describe cases where the power supply coil 34 including the coil pattern 34a preferably is disposed on the surface of the shield plate 33, as illustrated in FIGS. 3 and 16. However, the present invention is not limited thereto, and as one example, an insulative substrate 35 including a conductive pattern 35a that has the same function as the coil pattern 34a provided on one surface and a conductive pattern 35b that has the same shape as the shield plate 33 formed on the other surface may be used instead, as illustrated in FIG. 27. This makes it possible to reduce the thickness of the interface 30. In addition, a process for affixing the power supply coil 34 to the shield plate 33 is no longer necessary, which makes it possible to reduce the manufacturing cost. Furthermore, the conductive pattern corresponding to the coil pattern 34a and a conductive pattern corresponding to the shield plate 33 are able to be positioned with precision. This improves the communication sensitivity.

Meanwhile, the substrate 35 may be a flexible substrate. For example, configuring the substrate 35, the display 32, and the touch panel 31 from respective flexible substrates makes it possible to realize a flexible interface 30.

Figure 28:
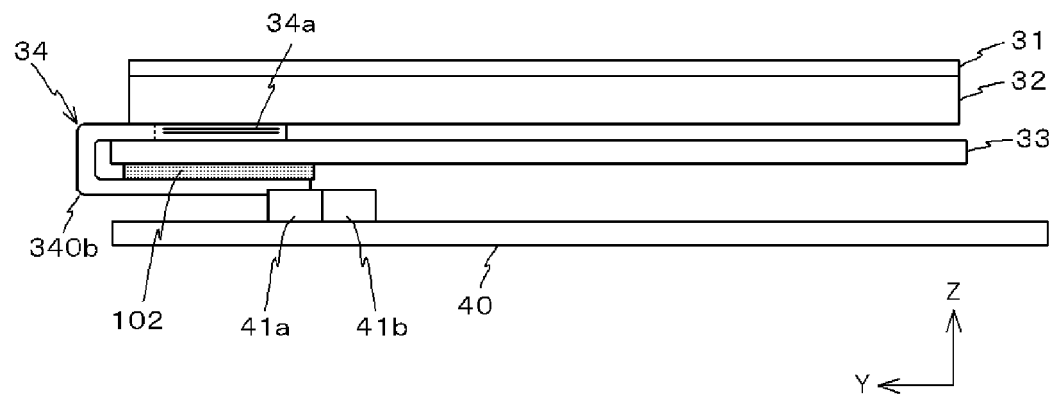
FIG. 28 is a diagram illustrating a variation on an interface.

In the interface 30A according to the second preferred embodiment, a magnetic sheet 102 preferably provided between the control board 40 and the coil pattern 34a as illustrated in FIG. 28. Electromagnetic waves emitted from the electrical components mounted on the control board 40 toward the coil pattern 34a are blocked by the magnetic sheet 102. This improves the stability of communication with the external device.

Figure 29:
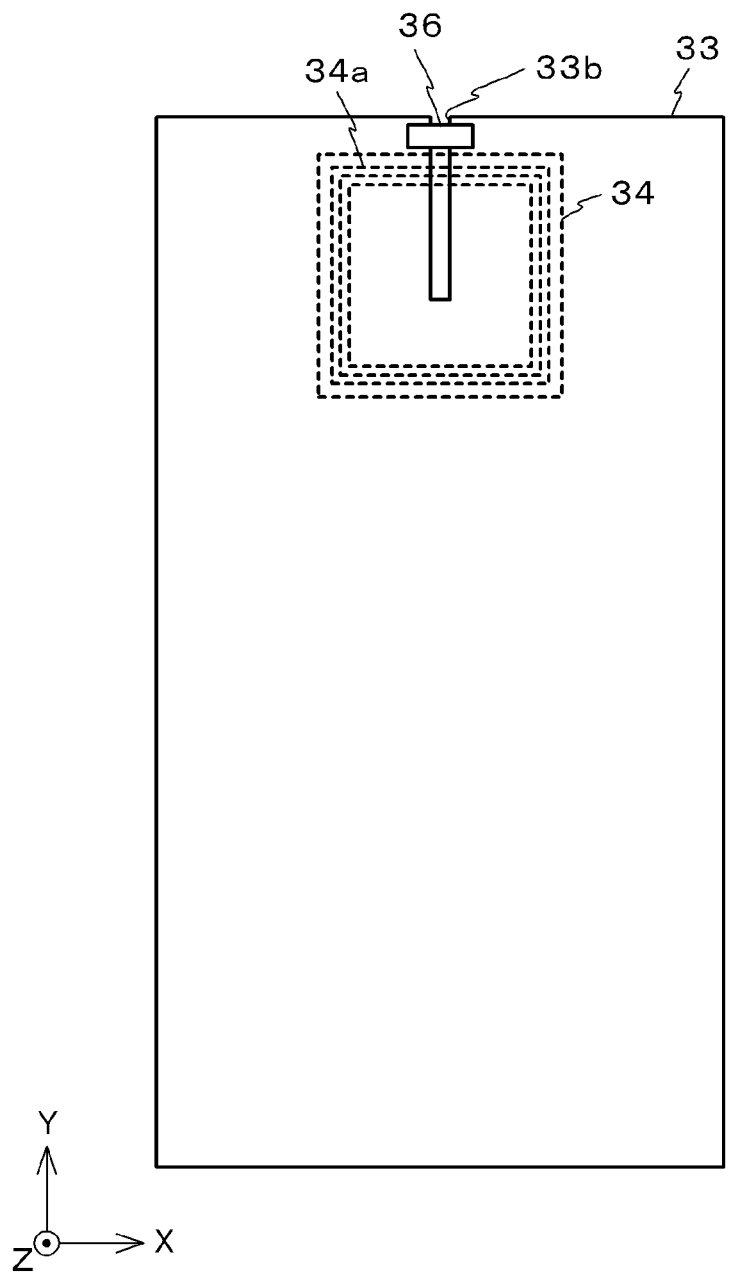
FIG. 29 is a plan view illustrating a capacitor disposed across a slit.
Figure 30:
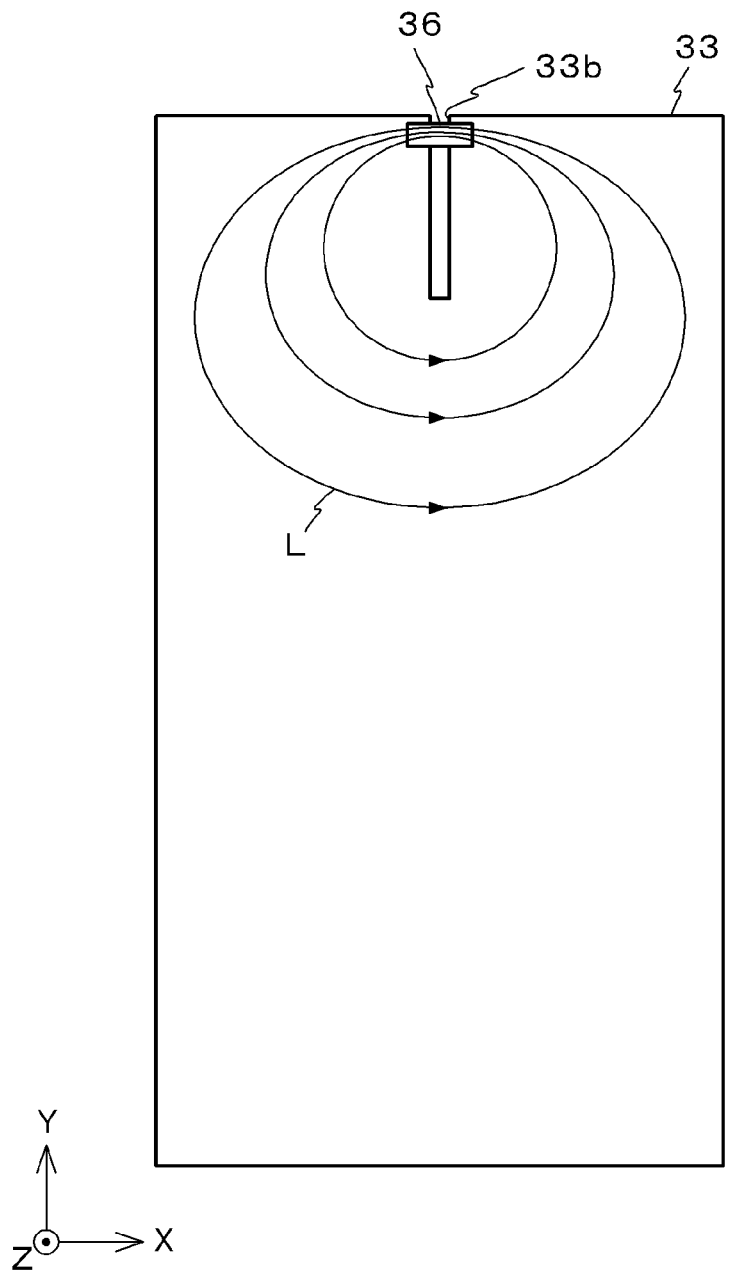
FIG. 30 is a diagram illustrating a current flowing via a capacitor.

A capacitor 36 preferably is connected to the shield plate 33 at the slit 33b as illustrated in FIG. 29, and the shield plate 33 preferably is caused to resonate near a usage frequency. In this case, the current flowing in the shield plate 33 is not distributed as indicated by the arrow aw in FIG. 3 due to the cut-edge effect, and instead has a distribution as indicated by a curve L in FIG. 30. Causing the shield plate 33 to resonate makes it possible to improve the antenna sensitivity. This improvement increases as the resonant frequency approaches the usage frequency.

Figure 31:
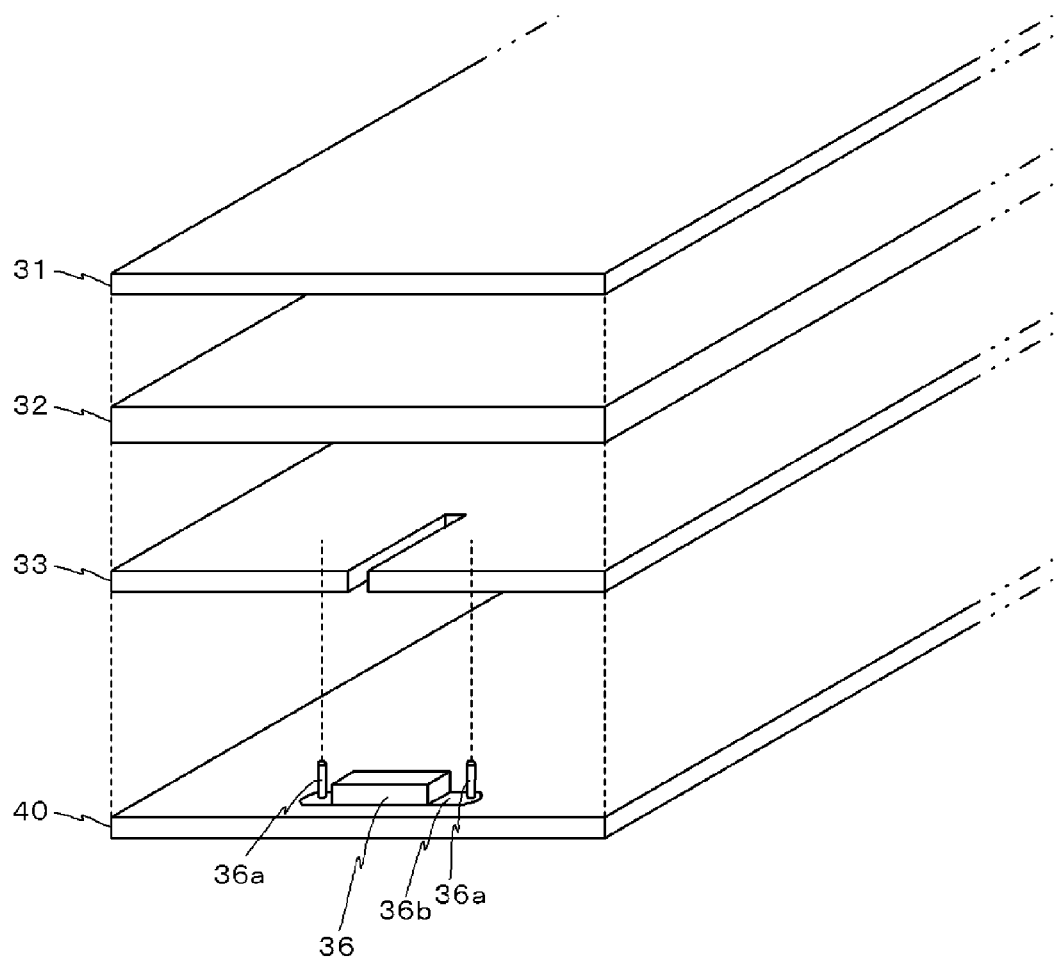
FIG. 31 is a diagram illustrating the positioning of a capacitor.
Figure 32:
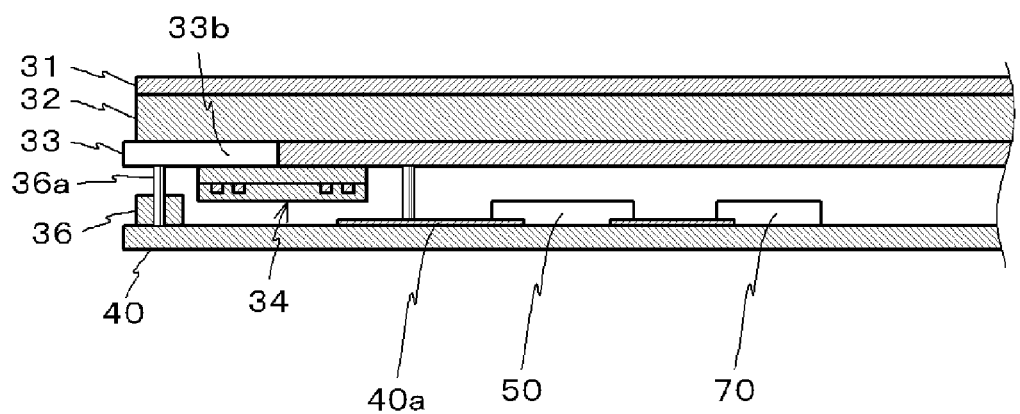
FIG. 32 is a diagram illustrating the positioning of a capacitor.

Note that the capacitor 36 preferably is connected to the shield plate 33 directly using solder or the like, for example. Meanwhile, the capacitor 36 preferably is mounted on the top surface of the control board 40, and spring pins 36a electrically connected to the capacitor 36 via mounting lands 36b preferably are respectively connected to the shield plate 33, as illustrated in FIGS. 31 and 32.

In the foregoing preferred embodiments, a program stored in the auxiliary storage unit 52 of the control system 60 preferably is recorded into and distributed as a computer-readable recording medium, and a control system that executes the display processing may be configured by uploading the program to the auxiliary storage unit 52.

Meanwhile, the program preferably may be stored in a disk device or the like provided in a predetermined server device on a communication network such as the Internet, and the program may then be downloaded to the auxiliary storage unit 52 by multiplexing carrier waves, for example.

Many other preferred embodiments and variations can be made based on the present invention without departing from the essential spirit of the present invention. The foregoing preferred embodiments are merely examples of the present invention, and are not intended to limit the scope of the present invention in any manner.

The present invention claims the benefit of Japanese Patent Application No. 2012-237326, filed Oct. 26, 2012, and Japanese Patent Application No. 2013-139068, filed Jul. 2, 2013. The specifications, claims, and drawings of Japanese Patent Application No. 2012-237326 and Japanese Patent Application No. 2013-139068 are hereby incorporated into the present specification in their entireties.

The interface and non-transitory computer-readable medium including a program according to various preferred embodiments of the present invention are useful in the exchange of information with an external device. The communication apparatus and non-transitory computer-readable medium including a program according to various preferred embodiments of the present invention are useful in communication with an external device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal comprising:
a display device that displays information on a surface on a first side thereof;
a shield plate disposed on a second side of the display device that is opposite to the first side; and
a power supply coil conductor that electromagnetically couples with the shield plate; wherein
the power supply coil conductor is, when viewed from a normal direction of the surface on the first side of the display device, disposed so that a coil opening portion of the power supply coil conductor is at least partially positioned farther outward than an outer contour end portion of the shield plate and so that the power supply coil conductor at least partially overlaps with the shield plate, and is adjacent to the shield plate;
all portions or substantially all portions of the shield plate overlap with the second side of the display device;
the shield plate is configured and arranged to prevent electromagnetic waves emanating from the display device from entering electric circuitry in the communication terminal as noise; and
the shield plate defines and functions as an antenna that communicates with a communication partner positioned on the first side of the display device.

2. The communication terminal according to claim 1, wherein
the display device includes a transparent electrode;
the transparent electrode is thinner than a radius of an opening in the coil opening portion; and
a magnetic flux emitted from the power supply coil conductor or a magnetic flux from the communication partner passes through a gap in the transparent electrode.

3. The communication terminal according to claim 1, wherein
the display device includes a transparent electrode;
the transparent electrode is narrower and thinner than a coil pattern that configures the power supply coil conductor; and
a magnetic flux emitted from the power supply coil conductor or a magnetic flux from the communication partner passes through a gap in the transparent electrode.

4. The communication terminal according to claim 1, wherein the shield plate is disposed between the display device and the power supply coil conductor.

5. The communication terminal according to claim 1, wherein
the power supply coil conductor is disposed between the display device and the shield plate.

6. The communication terminal according to claim 1, wherein the opening portion in the shield plate exposes the coil opening portion.

7. The communication terminal according to claim 6, wherein the opening portion includes an opening provided in the shield plate and a slit extending from the opening to an outer edge of the shield plate.

8. The communication terminal according to claim 6, wherein the opening portion includes a slit in the shield plate.

9. A communication terminal comprising:
a display device that displays information on a surface on a first side thereof;
a shield plate disposed on a second side of the display device; and
a power supply coil conductor that electromagnetically couples with and is adjacent to the shield plate; wherein
the power supply coil conductor is, when viewed from a normal direction of the surface on the first side of the display device, disposed so that a coil opening portion of the power supply coil conductor is at least partially positioned farther outward than an outer contour end portion of the shield plate and so that the power supply coil conductor at least partially overlaps with the shield plate, and is adjacent to the shield plate;
all portions or substantially all portions of the shield plate overlap with the second side of the display device;
the shield plate is configured and arranged to prevent electromagnetic waves emanating from the display device from entering electric circuitry in the communication terminal as noise;
the shield plate defines and functions as an antenna that communicates with a communication partner positioned on the first side of the display device; and
the display device displays information enabling a position of the power supply coil conductor to be seen in a display screen corresponding to the surface on the first side.

10. The communication terminal according to claim 9, wherein the display device displays information enabling a position where sensitivity of the power supply coil conductor is highest to be seen in the display screen.

11. The communication terminal according to claim 1, further comprising a touch panel overlapping with the surface on the first side of the display device.

12. The communication terminal according to claim 11, wherein the touch panel is an electrostatic capacitance touch panel.

13. The communication terminal according to claim 1, wherein the display device is a liquid crystal panel.

14. The communication terminal according to claim 13, wherein the liquid crystal panel includes a plurality of transparent electrodes arranged at equal or substantially equal intervals in a first direction and a plurality of transparent electrodes that face the transparent electrodes and are arranged at equal or substantially equal intervals in a second direction orthogonal or substantially orthogonal to the first direction.

15. The communication terminal according to claim 1, further comprising a communication unit that communicates with an external device via the power supply coil conductor.

16. The communication terminal according to claim 15, wherein the communication unit carries out near-field communication with the external device.

17. A non-transitory computer-readable medium containing a program that when run on a computer carries out a procedure for displaying information enabling a position of a power supply coil conductor to be seen in a display screen corresponding to a surface on a first side of a display device of a communication terminal including:
the display device that displays information on the surface on the first side;

a shield plate disposed on a second side of the display device that is opposite from the surface on the first side; and a power supply coil conductor that electromagnetically couples with and is adjacent to the shield plate; wherein the power supply coil conductor is, when viewed from a normal direction of the surface on the first side of the display device, disposed so that a coil opening portion of the power supply coil conductor is at least partially positioned farther outward than an outer contour end portion of the shield plate and so that the power supply coil conductor at least partially overlaps with the shield plate, and is adjacent to the shield plate;

all portions or substantially all portions of the shield plate overlap with the second side of the display device;

the shield plate is configured and arranged to prevent electromagnetic waves emanating from the display device from entering electric circuitry in the communication terminal as noise; and the shield plate defines and functions as an antenna that communicates with a communication partner positioned on the first side of the display device.

18. A non-transitory computer-readable medium containing a program that when run on a computer carries out a procedure for displaying information enabling a position where a sensitivity of a power supply coil conductor is highest to be seen in a display screen corresponding to a surface on a first side of a display device of a communication terminal including:

the display device that displays information on the surface on the first side, a shield plate disposed on a second side of the display device that is opposite from the surface on the first side; and a power supply coil conductor that electromagnetically couples with and is adjacent to the shield plate; wherein the power supply coil conductor is, when viewed from a normal direction of the surface on the first side of the display device, disposed so that a coil opening portion of the power supply coil conductor is at least partially positioned farther outward than an outer contour end portion of the shield plate and so that the power supply coil conductor at least partially overlaps with the shield plate, and is adjacent to the shield plate;

all portions or substantially all portions of the shield plate overlap with the second side of the display device;

the shield plate is configured and arranged to prevent electromagnetic waves emanating from the display device from entering electric circuitry in the communication terminal as noise; and the shield plate defines and functions as an antenna that communicates with a communication partner positioned on the first side of the display device.

19. The communication terminal according to claim 1, further comprising:

a magnetic body that overlaps the power supply coil conductor; wherein the shield plate is disposed between the display device and the power supply coil conductor; and the power supply coil conductor is disposed between the magnetic body and the shield plate.

* * * * *